(12) United States Patent
Shimizu et al.

(10) Patent No.: US 6,460,942 B1
(45) Date of Patent: *Oct. 8, 2002

(54) BRAKING FORCE CONTROLLER

(75) Inventors: Satoshi Shimizu; Yoshiyuki Hashimoto, both of Susono (JP)

(73) Assignee: Toyota Jidosha Kabushiki Kaisha, Toyota (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/171,582

(22) PCT Filed: Apr. 22, 1997

(86) PCT No.: PCT/JP97/01380

§ 371 (c)(1),
(2), (4) Date: Jan. 15, 1999

(87) PCT Pub. No.: WO97/39932

PCT Pub. Date: Oct. 30, 1997

(30) Foreign Application Priority Data

Apr. 23, 1996 (JP) ............................................. 8-101593

(51) Int. Cl.[7] ................................................ B60T 8/86
(52) U.S. Cl. ...................... 303/125; 303/11; 303/113.1; 303/113.4
(58) Field of Search ............................ 303/125, 10, 11, 303/113.1, 113.2, 122.12–122.15, 166, 116.1, 116.2, 116.3, DIG. 1, DIG. 2, DIG. 3, DIG. 4, 113.4

(56) References Cited

U.S. PATENT DOCUMENTS

| | | | |
|---|---|---|---|
| 5,039,283 A | * 8/1991 | Mergenthaler et al. | ....... 303/87 |
| 5,158,343 A | 10/1992 | Reichelt et al. | |
| 5,176,430 A | * 1/1993 | Kuwana et al. | ............. 303/158 |
| 5,222,787 A | * 6/1993 | Eddy et al. | .................... 303/10 |
| 5,261,730 A | 11/1993 | Steiner et al. | |

(List continued on next page.)

FOREIGN PATENT DOCUMENTS

| | | |
|---|---|---|
| DE | 4427246 | 2/1996 |
| EP | 0711695 | 5/1996 |
| GB | 2282649 | 4/1995 |
| GB | 2295209 | 5/1996 |
| JP | 61-268560 | 11/1986 |
| JP | 3-227766 | 1/1991 |
| JP | 4-121260 | 4/1992 |
| JP | 7-329766 | 6/1995 |
| JP | 8-34326 | 2/1996 |
| JP | 8-40229 | 2/1996 |
| JP | 8-295224 | 11/1996 |
| WO | WO96/06763 | 3/1996 |

OTHER PUBLICATIONS

Patent Abstracts of Japan, vol. 017, No. 439 (M–1462), Aug. 13, 1993 & JP 05 097022 A (Nisshinbo Ind. Inc.), Apr. 20, 1993.

* cited by examiner

Primary Examiner—Jack Lavinder
Assistant Examiner—Melanie Torres
(74) Attorney, Agent, or Firm—Kenyon & Kenyon

(57) ABSTRACT

When a normal braking is performed, a master cylinder (32) and wheel cylinders (44FR, 44FL, 44RR, 44RL) are set to a conducting state. When an emergency braking is performed, the master cylinder and the wheel cylinders are joined together so that a large brake force can be generated. If the wheel cylinders are connected to an accumulator soon after the emergency braking, an increase in the wheel cylinder pressure can be prevented. Even after the emergency braking, the wheel cylinders and the master cylinder are maintained in the conducting state while the master cylinder pressure is rapidly increasing.

15 Claims, 9 Drawing Sheets

U.S. PATENT DOCUMENTS

| | | | |
|---|---|---|---|
| 5,342,120 A | * 8/1994 | Zimmer et al. | 303/113.2 |
| 5,350,225 A | 9/1994 | Steiner et al. | |
| 5,367,942 A | 11/1994 | Nell et al. | |
| 5,427,442 A | 6/1995 | Heibel | |
| 5,445,444 A | 8/1995 | Rump et al. | |
| 5,492,397 A | 2/1996 | Steiner et al. | |
| 5,496,099 A | 3/1996 | Resch | |
| 5,499,866 A | 3/1996 | Brugger et al. | |
| 5,513,906 A | 5/1996 | Steiner | |
| 5,535,123 A | 7/1996 | Rump et al. | |
| 5,549,369 A | 8/1996 | Rump et al. | |
| 5,556,173 A | 9/1996 | Steiner et al. | |
| 5,564,797 A | 10/1996 | Steiner et al. | |
| 5,567,021 A | 10/1996 | Gaillard | |
| 5,584,542 A | 12/1996 | Klarer et al. | |
| 5,586,814 A | 12/1996 | Steiner | |
| 5,601,344 A | * 2/1997 | Matsunaga et al. | 303/115.4 |
| 5,658,055 A | 8/1997 | Dieringer et al. | |
| 5,660,448 A | 8/1997 | Kiesewetter et al. | |
| 5,669,676 A | 9/1997 | Rump et al. | |
| 5,695,260 A | * 12/1997 | Tanaka et al. | 303/122.12 |
| 5,719,769 A | 2/1998 | Brugger et al. | |
| 5,720,532 A | 2/1998 | Steiner et al. | |
| 5,772,290 A | 6/1998 | Heibel et al. | |
| 5,797,664 A | * 8/1998 | Tagawa | 303/190 |
| 5,806,010 A | * 9/1998 | Sawada | 303/10 X |
| 5,890,776 A | * 4/1999 | Sawada | 303/116.1 |
| 6,234,589 B1 | * 5/2001 | Yoshida | 303/157 |

BRAKING FORCE CONTROLLER

TECHNICAL FIELD

The present invention relates to a brake force control apparatus and, more particularly, to a brake force control apparatus which executes a brake assist control that generates a brake force greater than that generated at an ordinary time, when an emergency braking is performed by a driver of a vehicle.

Conventionally, for example, as disclosed in Japanese Laid-Open Patent Application 4-121260, a brake force control apparatus is known which generates, when an emergency braking is required, a brake force greater than that generated in a normal time. The above-mentioned conventional apparatus is equipped with a brake booster, which generates a pushing force having a given power ratio with respect to a brake pressing force Fp. The pushing force generated by the brake booster is transferred to a master cylinder. The master cylinder generates a master cylinder pressure $P_{M/C}$ based on the pushing force of the brake booster, that is, the brake pressing force Fp.

The above-conventional apparatus is equipped with a fluid pressure generating mechanism, which generates an assist hydraulic pressure in which a pump is used as a fluid pressure source. The fluid pressure generating mechanism generates the assist hydraulic pressure based on a driving signal supplied from a control circuit. When the brake pedal is operated at a speed higher than a predetermined speed, the control circuit determines that an emergency braking is carried out by the driver, and requests a fluid pressure generating mechanism to the maximum assist hydraulic pressure. The maximum assist hydraulic pressure generated by the fluid pressure generating mechanism is supplied to a change valve together with the master cylinder pressure $P_{M/C}$. The change valve supplies the higher one of the assist hydraulic pressure generated by the fluid pressure generating mechanism and the master cylinder pressure $P_{M/C}$ toward wheel cylinders.

According to the conventional apparatus, if the brake pedal is operated at a speed equal to or less than the given operating speed, the master cylinder pressure $P_{M/C}$ adjusted to a level depending on the brake pressing force Fp is supplied to the wheel cylinders. Hereinafter, the control of realizing the above-mentioned state will be referred to as a normal control. If the brake pedal is operated at a speed higher than the given operating speed, a high assist hydraulic pressure is supplied to the wheel cylinders in which the pump serves as a fluid pressure source. Hereinafter, the control of realizing the above-mentioned state will be referred to as a brake assist control Hence, according to the conventional apparatus, the brake force is controlled to a level based on the brake pressing force Fp at ordinary time, and to rapidly increase the brake force after emergency braking is executed.

The above-mentioned conventional apparatus is equipped with a change valve. The change valve is a mechanism, which selects a state in which the master cylinder serves as a fluid pressure source or a state in which the fluid pressure generating mechanism serves as a fluid pressure source. More particularly, the change valve selectively realizes a state in which the wheel cylinders are coupled to the master cylinder (hereinafter referred to as a first state) and a state in which the wheel cylinders are coupled to the fluid pressure generating mechanism (hereinafter referred to as second state).

The first and second states can also be realized by a two-position switch valve. The change valve has a complex structure and is expensive than the two-position switch valve. Hence, when the two-position switch valve is used instead of the change valve, the conventional apparatus can be produced at a reduced cost.

Anyway, the above-mentioned conventional apparatus starts to increase the wheel cylinder pressure at the same time as emergency braking is performed. However, if the switching between the fluid liquid sources is implemented by the two-position switch valve, the switching time is required to be determined taking into consideration the output characteristic of the fluid pressure generating mechanism and the motion performance of the vehicle.

More particularly. at the time when emergency braking is recognized, the brake pedal is being operated at a high speed, and thus a rapid increase in the master cylinder pressure $P_{M/C}$ takes place. The speed at which the assist hydraulic pressure generated by the fluid pressure source is limited to an appropriate value due to he capability of the pump or the like.

Hence, if the fluid pressure source is switched to the fluid pressure generating mechanism from the master cylinder immediately after the emergency braking is recognized. a decrease in the increasing speed of the wheel cylinder pressure, as compared to a case where the master cylinder is maintained as the fluid pressure source. In order to prevent occurrence such a problem at the time of emergency braking, it is desired that the fluid pressure source be switched to the fluid pressure generating mechanism from the master cylinder when an appropriate delay time elapses after the emergency braking is recognized.

In the above-mentioned apparatus, when the brake assist control is started, the ground contact ability of tires is partially consumed in order to produce brake force. Hence, if the brake assist control is executed while the vehicle is turned, the maximum value of cornering forces which can be produced by the tires becomes less than that a value obtained when the brake assist control is not executed.

The maximum value of the cornering forces generated in the tires increases as the load exerted on the tires increases. Hence, when the brake assist control is active in which the weight of the vehicle is shifted toward the front wheels, the maximum value of the cornering forces which can be produced by the rear tires is greatly decreased.

The above-mentioned conventional apparatus executes the brake assist control without any consideration of the turning state of the vehicle. Hence, in the vehicle equipped with the above-mentioned conventional apparatus, the maximum value of the cornering forces generated by the rear wheels may greatly be less than the maximum value of the cornering forces generated by the front wheels.

In order to suppress the decrease in the cornering forces of the rear wheels, it is desirable that the brake assist control to the rear wheels be started with an appropriate delay time after the brake assist control to the front wheels is started.

The conventional apparatus in which the brake assist control to the front wheels and that to the rear wheels are simultaneously started is not an ideal one capable of maintaining the stable behavior of the vehicle which is turning.

DISCLOSURE OF INVENTION

The present invention is made in view of the above-mentioned point, and it is the first object of the present invention to provide a brake force control apparatus in which the brake assist control is started at a timing different from the timing at which an emergency braking is recognized and preferable braking performance can thus be provided.

The brake force control apparatus directed to achieving the above object includes an operation fluid pressure generating mechanism that generates an operation fluid pressure depending on a degree of operation of a brake pedal by a driver, a high-pressure source generating a control fluid pressure higher than that of the fluid pressure generated by said operation fluid pressure generating mechanism, a switch mechanism for selectively connecting one of the operation fluid pressure generating mechanism to the high-pressure source and a wheel cylinder, and emergency braking detection means for detecting execution of an emergency braking. When an emergency braking is performed by the driver, a brake assist control for boosting a wheel cylinder pressure in such a way that the high-pressure source serves as a fluid pressure source The brake force control apparatus which achieves the above object is configured so that, as a start timing, a time is detected at which a controlled pressure increasing slope obtained by boosting the wheel cylinder pressure with the high-pressure source used as the fluid pressure source exceeds a normal pressure increasing slope obtained by boosting the wheel cylinder pressure with the master cylinder used as the fluid pressure source. Also, the brake assist control is started after the emergency braking is detected and the start timing is then detected.

In the brake force control apparatus according to the present intention, a fluid pressure based on a brake operation force is supplied, at the normal time, to the wheel cylinders from the operation fluid pressure generating mechanism. After the brake assist control is started, the high-pressure source is used as the fluid source, and a fluid pressure higher than that at the normal time is supplied to the wheel cylinders in the present invention, the brake assist control employs, as the fluid pressure source, the operation fluid pressure generating mechanism, and starts after a situation is created in which the wheel cylinder pressure can rather be boosted rapidly with the high-pressure source used as the fluid pressure source Hence, it is possible to prevent an event in which an increase in the wheel cylinder pressure is prevented due to execution of the brake assist control.

A second object of the present invention is to provide a brake force control apparatus in which the brake assist control of the front wheels and the brake assist control of the rear wheels are started at respective, different times and preferable braking performance can be realized.

The brake force control apparatus which achieves the above object is equipped with a high-pressure source which generates a predetermined control fluid pressure, a front wheel fluid pressure control mechanism that controls a wheel cylinder pressure of front wheels with the high-pressure source used as a fluid pressure source, a rear wheel fluid pressure control mechanism that controls a wheel cylinder pressure of rear wheels with the high-pressure source used as the fluid pressure source, and emergency braking detection means for detecting execution of an emergency braking. When an emergency braking is performed by the driver, a brake assist control for generating a wheel cylinder pressure higher than that generated at a normal time is generated.

The brake assist control of the front wheels is started after the emergency braking is detected. Then the brake assist control of the rear wheels is started when a predetermined rear wheel delay time elapses after the brake assist control of the front wheel is started. The brake assist control of the rear wheels in the present invention is started when the predetermined rear wheel delay time elapses after the brake assist control of the front wheels is started. When the brake assist control of the front wheels is started, the vertical load of the rear wheels is decreased due to load shifting, and thus the cornering forces that can be generated by the rear wheels is reduced. Hence, if the brake assist controls of the front and rear wheels are simultaneously started, the cornering forces generated by the rear wheels may abruptly be decreased According to the present invention, it is possible to suppress decrease in the cornering forces of the rear wheels resulting from the start of the brake assist control. Hence, even if an emergency braking is performed when the vehicle is turning, a large braking force can be ensured without change of the turning behavior.

BEST MODE FOR CARRYING OUT THE INVENTION

Figure 1:
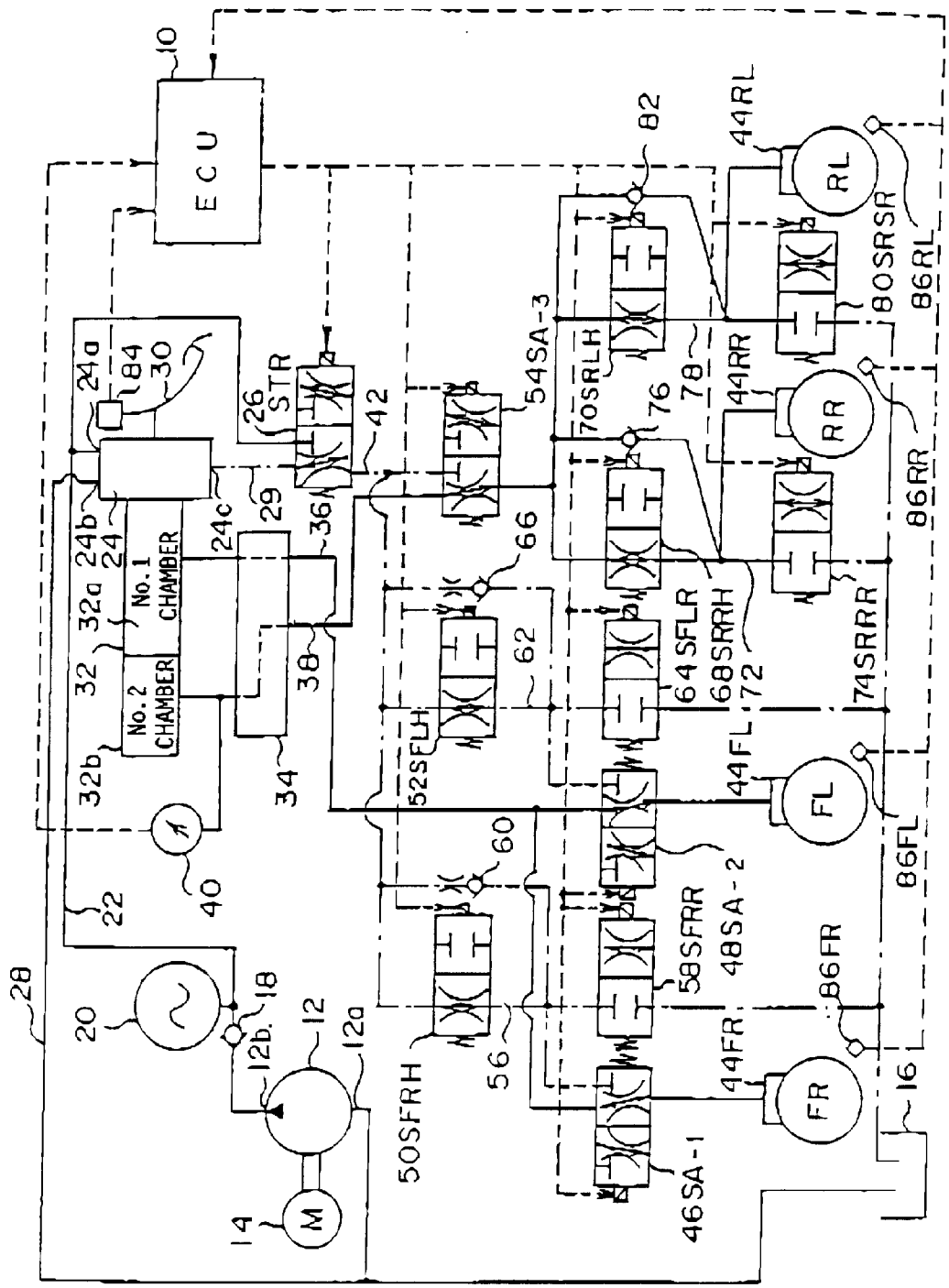
FIG. 1 is a system structure diagram of a brake force control apparatus according to an embodiment of the present invention.

FIG. 1 is a system structure diagram of a brake force control apparatus according to an embodiment of the present invention. The brake force control apparatus shown in FIG. 1 is controlled by an electronic control unit 10 (hereinafter, referred to as ECU 10). The brake force control apparatus comprises a pump 12. The pump 12 has a motor 14 as a power source thereof. An inlet port 12a of the pump 12a communicates with a reservoir tank 16. An accumulator 20 communicates with an outlet port 12b of the pump via a check valve 18. The pump 12 delivers brake fluid in the reservoir tank 16 from the outlet port 12b so that a predetermined pressure is always accumulated in the accumulator 20.

The accumulator 20 communicates with a high-pressure port 24a of a regulator 24 via a high-pressure passage 22, and communicates with a regulator switching solenoid 26 (hereinafter, referred to as STR 26). The regulator 24 has a low-pressure port 24b and a control fluid pressure port 24c. The low-pressure port 24b communicates with the reservoir tank 16 via a low-pressure passage 28, The control fluid pressure port 24c communicates with the STR 26 via a control fluid pressure passage 29. The STR 26 is a two-position solenoid valve which selectively set one of the control fluid pressure passage 29 and the high-pressure passage 22 in a conductive state, and sets the control fluid pressure passage 29 in a conductive state and sets the high-pressure passage 22 in a closed state in a normal state.

A brake pedal 30 is connected to the regulator 24, and a master cylinder is mounted to the regulator 24. The regulator 24 has a fluid pressure chamber therein. The fluid pressure chamber always communicates with the control fluid pressure port 24c, and selectively communicates with the high-pressure port 24a or the low-pressure port 24b in accordance with an operational state of the brake pedal 30. The regulator 24 is configured so that a pressure inside the fluid pressure chamber is adjusted to a fluid pressure corresponding to a brake pressing force $F_P$ exerted on the brake pedal 30. Accordingly, the fluid pressure corresponding to the brake pressing force $F_P$ always appears at the control fluid pressure port 24c of the regulator 24. Hereinafter, this fluid pressure is referred to as a regulator pressure $P_{RE}$.

The brake pressing force $F_P$ exerted on the brake pedal 30 is mechanically transmitted to the master cylinder 32 via the regulator 24. Additionally, a force corresponding to the fluid pressure inside the fluid pressure chamber of the regulator 24, that is, a force corresponding to the regulator pressure $P_{RE}$, is transmitted to the master cylinder 32.

The master cylinder 32 is provided with a first fluid pressure chamber 32a and a second fluid pressure chamber 32b therein. A master cylinder pressure $P_{M/C}$ corresponding to a resultant force of the brake pressing force $F_P$ and a brake assist force $F_A$ is generated in the first fluid pressure chamber 32a and the second fluid pressure chamber 32b. Both the master cylinder pressure $P_{M/C}$ generated in the first fluid pressure chamber 32a and the master cylinder pressure $P_{M/C}$ generated in the second fluid pressure chamber 32b are supplied to a proportioning valve 34 (hereinafter, referred to as P valve 34).

The P valve 34 communicates with a first fluid pressure passage 36 and a second fluid pressure passage 38. The P valve 34 supplies the master cylinder pressure $P_{M/C}$ to the first fluid pressure passage 36 and the second fluid pressure passage 38 without change in a range where the master cylinder pressure $P_{M/C}$ is less than a predetermined value. Additionally, the P valve 34 supplies the master cylinder pressure $P_{M/C}$ to the first fluid pressure passage 36 without change and supplies a fluid pressure obtained by decreasing the master cylinder pressure $P_{M/C}$ by a predetermined ratio to the second fluid pressure passage 38 in a range where the master cylinder pressure $P_{M/C}$ is less than a predetermined value.

A hydraulic pressure sensor 40, which outputs an electric signal corresponding to the master cylinder pressure $P_{M/C}$, is provided between the second fluid pressure chamber 32b of the master cylinder 32 and the P valve 34. An output signal of the hydraulic pressure sensor 40 is supplied to the ECU 10 The ECU 10 detects the master cylinder pressure $P_{M/C}$ generated in the master cylinder 32 based on the output signal of the hydraulic pressure sensor 40.

The above-mentioned STR 26 communicates with a third fluid pressure passage 42. The third fluid pressure passage 42 communicates with one of the control fluid pressure passage 29 and the high-pressure passage 22 in accordance with a state of the STR 26. In the present embodiment, wheel cylinders 44FL and 44FR provided to left and right front wheels FL and FR are provided with a brake fluid pressure from the first fluid pressure passage 36 communicating with the P valve 34 or the third fluid pressure passage 42 communicating with the STR 26. Additionally, wheel cylinders 44RL and 44RR provided to left and right rear wheels RL and RR are provided with a brake fluid pressure from the second fluid pressure passage 38 communicating with the P valve 34 or the third fluid pressure passage 42 communicating with the STR 26.

The first fluid pressure passage 36 communicates with a first assist solenoid valve 46 (hereinafter referred to as $SA_{-1}$ 46) and a second assist solenoid valve 48 (hereinafter, referred to as $SA_{-2}$ 48). On the other hand, the third fluid pressure passage 42 communicates with a right front holding solenoid valve 50 (hereinafter, referred to as SFRH 50), a left front holding solenoid valve 52 (hereinafter, referred to as SFLH 52) and a third assist solenoid valve 54 (hereinafter, referred to as $SA_{-3}$ 54).

The SFRH 50 is a two-position solenoid valve which maintains an open state in a norma state. The SFRH 50 communicates with the $SA_{-1}$ 46 and a right front wheel pressure decreasing solenoid valve 58 (hereinafter, referred to as SFRR 58) via a pressure adjusting fluid pressure passage 56. A check valve 60 permitting a fluid flow only in a direction from the pressure adjusting fluid pressure passage 56 to the third fluid pressure passage 42 is provided, in parallel, between the third fluid pressure passage 42 and the pressure adjusting fluid pressure passage 56.

The $SA_{-1}$ 46 is a two-position solenoid valve which selectively renders one of the first fluid pressure passage 36 and the pressure adjusting fluid pressure passage 56 to be communicated with the wheel cylinder 44FR, and renders the first fluid pressure passage 36 and the wheel cylinder 44FR to be in a communicating state in a normal state (OFF state). On the other hand, the SFRR 58 is a two-position solenoid valve which renders the pressure adjusting fluid pressure passage 56 and the reservoir tank 16 to be in a connected state or a disconnected state. The SFRR 58 renders the pressure adjusting fluid pressure passage 56 and the reservoir tank 16 to be in a disconnected state in a normal state (OFF state).

The SFLH 52 is a two-position solenoid valve which maintains an open state in a normal state. The SFLH 52 communicates with the $SA_{-2}$ 48 and a left front wheel pressure decreasing solenoid valve 64 (hereinafter, referred to as SFLR 64) via a pressure adjusting fluid pressure passage 62. A check valve 66 permitting a fluid flow only in a direction from the pressure adjusting fluid pressure passage 62 to the third fluid pressure passage 42 is provided, in parallel, between the third fluid pressure passage 42 and the pressure adjusting fluid pressure passage 62.

The $SA_{-2}$ 48 is a two-position solenoid valve which selectively renders one of the first fluid pressure passage 36 and the pressure adjusting fluid pressure passage 62 to be communicated with the wheel cylinder 44FL, and renders the first fluid pressure passage 36 and the wheel cylinder 44FL to be in a communicating state in a normal state (OFF state). On the other hand, the SFLR 64 is a two-position solenoid valve which renders the pressure adjusting fluid pressure passage 62 and the reservoir tank 16 to be in a connected state or a disconnected state. The SFLR 64 renders the pressure adjusting fluid pressure passage 62 and the reservoir tank 16 to be in a disconnected state from each other in a normal state (OFF state).

The second fluid pressure passage 38 communicates with the above-mentioned $SA_{-3}$ 54. The downstream side of the $SA_{-3}$ 54 communicates with a right rear wheel holding solenoid valve 68 (hereinafter, referred to as SRRH 68) provided in correspondence with a wheel cylinder 44RR of the right rear wheel RR and a left rear wheel holding solenoid valve 70 (hereinafter, referred to as SRLR 70) provided in correspondence with a wheel cylinder 44RL of the left rear wheel RL. The $SA_{-3}$ 54 is a two-position solenoid valve which selectively selectively renders one of the second fluid pressure passage 38 and the third fluid pressure passage 42 to be communicated with the SRRH 68 and the SRLR 70, and renders the second fluid pressure passage 38, the SRRH 68 and the SRLR 70 in a communicating state in a normal state (OFF state).

The downstream side of the SRRH 68 communicates with the wheel cylinder 44RR and a right rear wheel pressure decreasing solenoid valve 74 (hereinafter, referred to as SRRR 74) via a pressure adjusting fluid pressure passage 72. The SRRR 74 is a two-position solenoid valve which renders the pressure adjusting fluid pressure passage 72 and the reservoir tank 16 in a communicating state or a disconnected state, and renders the pressure adjusting fluid pressure passage 72 and the reservoir tank 16 in the disconnected state in a normal state (OFF state). Additionally, a check valve 76 permitting a fluid flow only in a direction from the pressure adjusting fluid pressure passage 72 to the $SA_{-3}$ 54 is provided, in parallel, between the $SA_{-3}$ 54 and the pressure adjusting fluid pressure passage 72.

Similarly, the downstream side of the SRLH 70 communicates with the wheel cylinder 44RL and a left rear wheel pressure decreasing solenoid valve 80 (hereinafter, referred to as SRLR 80) via a pressure adjusting fluid pressure passage 78. The SRLR 80 is a two-position solenoid valve which renders the pressure adjusting fluid pressure passage 78 and the reservoir tank 16 in a communicating state or a disconnected state, and renders the pressure adjusting fluid pressure passage 78 and the reservoir tank 16 in the disconnected state in a normal state (OFF state), Additionally, a check valve 82 permitting a fluid flow only in a direction from the pressure adjusting fluid pressure passage 78 to the $SA_{-3}$ 54 is provided, in parallel, between the $SA_{-3}$ 54 and the pressure adjusting fluid pressure passage 78.

In the system according to the present embodiment, a brake switch 84 is provided near the brake pedal 30. The brake switch 84 is a switch that generates an ON output when the brake pedal 30 is pressed. The output signal of the brake switch 84 is supplied to the ECU 10. The ECU 10 determines whether or not a braking operation is performed by the driver based on the output signal of the brake switch 84.

Additionally, in the system according to the present embodiment, wheel velocity sensors 86FL, 86FR, 86RL and 86RR (hereinafter, these are referred to as 86 as a whole) are provided near the left and right front wheels FL and FR and the left and right rear wheels RL and RR, each of the sensors generating a pulse signal when the respective wheel rotates a predetermined angle. The output signals of the wheel velocity sensors 86 are supplied to the ECU 10. The ECU 10 detects a wheel velocity of each of the wheels FL, FR, RL and RR based on the output signals of the wheel velocity sensors 86**.

The ECU 10 supplies, if necessary, drive signals to the above-mentioned STR 26, $SA_{-1}$ 46, $SA_{-2}$ 48, $SA_{-3}$ 54, SERH 50, SFLH 52, SFRR 58, SFLR 64, SRRH 68, SRLH 70, SRRR 74 and SRLR 80 based on the output signal of the brake switch 84.

A description will now be given of an operation of the brake force control apparatus according to the present embodiment. The brake force control apparatus according to the present embodiment performs the normal control for generating a brake force corresponding to the brake pressing force $F_P$ exerted on the brake pedal 30 when the vehicle is in a stable state. The normal control can be achieved, as shown in FIG. 1, by turning off all of the STR 26, $SA_{-1}$ 46, $SA_{-2}$ 48, $SA_{-3}$ 54, SFRH 50, SFLH 52, SFRR 58, SFLR 64, SRRH 68 SRLH 70, SRRR 74 and SRLR 80 based on the output signal of the brake switch 84.

That is, in the state shown in FIG. 1, the wheel cylinders 44FR and 44FL communicate with the first fluid pressure passage 36, and the wheel cylinders 44RR and 44RL communicate with the second fluid pressure passage 38. In this case, the brake fluid flows between the master cylinder 32 and the wheel cylinders 44FR, 44FL, 44RL and 44RR (hereinafter, these may be referred to as ** as a whole), and a brake force corresponding to the brake pressing force $F_P$ is generated in each of the wheels FL, FR, RL and RR.

In the present embodiment, when a possibility for shifting to a locked state is detected in one of the wheels, it is determined that a condition for performing an antilock brake control (hereinafter, referred to as ABS control) is established. The ECU 10 calculates wheel velocities $V_{WFL}$, $V_{WFR}$, $V_{WRL}$ and $V_{WRR}$ (hereinafter, these are referred to as $V_W^{}$ as a whole) of the wheels based on output signals of the wheel velocity sensors 86, and calculates an assumed value $V_{SO}$ (hereinafter, referred to as an assumed vehicle speed $V_{SO}$) of a speed of the vehicle according to a publicly known method. Then, when the vehicle is in a braking state, a slip rate S of each wheel is calculated according to the following equation so as to determine that the wheel may shift to a locked state when the slip rate S exceeds a predetermined value.

$$S=(V_{SO}-V_W^{**})\cdot 100/V_{SO} \qquad (1)$$

When the condition for performing the ABS control is established, the ECU 10 outputs the drive signals to the $SA_{-1}$ 46, $SA_{-2}$ 48 and $SA_{-3}$ 54. As a result, in when the $SA_{-1}$ 46 is turned on, the wheel cylinder 44FR is disconnected from the first fluid pressure passage 36 and connected to the pressure adjusting fluid pressure passage 56. Additionally, when the $SA_{-2}$ 48 is turned on, the wheel cylinder 44FL is disconnected from the first fluid pressure passage 36 and connected to the pressure adjusting fluid pressure passage 62. Further, when the $SA_{-3}$ 54 is turned on, the upstream side of the SRRH 68 and the SRLH 70 is disconnected from the second fluid pressure passage 38 and connected to the third fluid pressure passage 42.

In this case, all wheel cylinders 44 communicate with respective holding solenoid valves SFRH 50, SFLH 52, SRRH 68 and SRLH 70 (hereinafter, these are referred to as holding solenoid SH) and respective pressure decreasing solenoid valves SFRR 58, SFLR 64, SRRR 74 and SRLR 80 (hereinafter, these are referred to as pressure decreasing solenoid SR), and a regulator pressure PRE is introduced to the upstream side of each of the holding solenoids SH via the third fluid pressure passage 42 and the STR 26.

In the above-mentioned condition, a wheel cylinder pressure $P_{W/C}$ of the respective wheel cylinders 44 is increased with the regulator pressure $P_{RE}$ as an upper limit by the holding solenoids SH being in an open state and the pressure decreasing solenoids SR being in a closed state. Hereinafter, this state is referred to as a pressure increasing mode ①. Additionally, the wheel cylinder pressure $P_{W/C}$ of the respective wheel cylinders 44 is maintained without being increased or decreased by the holding solenoids SH being in a closed state and the pressure decreasing solenoids SR being in the closed state. Hereinafter, this state is referred to as a holding mode ②. Further, the wheel cylinder pressure $P_{W/C}$ of the respective wheel cylinders 44 is decreased by the holding solenoids SH being in the closed state and the pressure decreasing solenoids S**R being in the open state. Hereinafter, this state is referred to as a pressure decreasing mode ③. The ECU 10 achieves, if necessary, the above-mentioned pressure increasing mode ①, holding mode ② and pressure decreasing mode ③ so that a slip rate S of each wheel during a braking time becomes an appropriate value, that is, so that each wheel does not shift to the locked state.

When a depression of the brake pedal 30 is released by the driver during execution of the ABS control, the wheel cylinder pressure $P_{W/C}$ must be immediately decreased. In the system according to the present embodiment, the check valves 60, 66, 76 and 82 are provided in hydraulic pressure paths corresponding to each of the wheel cylinders 44, each of the check valves 60, 66, 76 and 82 permitting a fluid flow only in the directions from the wheel cylinders 44 to the third fluid pressure passage 42. Thus, according to the system of the present embodiment, the wheel cylinder pressures $P_{W/C}$ of all of the wheel cylinders 44** can be immediately decreased after the depression of the brake pedal 30 is released.

In the system according to the present embodiment, when the ABS control is performed, the wheel cylinder pressure $P_{W/C}$ is increased by the brake fluid being supplied from the regulator 24 to the wheel cylinders 44, that is, by the brake fluid being supplied from the pump 12 to the wheel cylinders 44, and is decreased by the brake fluid in the wheel cylinders 44** flowing to the reservoir tank 16. When the increase in the wheel cylinder pressure $P_{W/C}$ is performed by using the master cylinder 32 as a fluid pressure source and if the pressure increasing mode and the pressure decreasing mode are repeatedly performed, the brake fluid in the master cylinder 32 gradually decreases and a so-called bottoming of the master cylinder may occur.

On the other hand, if the pump 12 is used as a fluid pressure source so as to increase the wheel cylinder pressure $P_{W/C}$, as in the system according to the present embodiment, such a bottoming can be prevented. Thus, in the system according to the present embodiment, a stable operational state can be maintained if the ABS control is continued for a long time.

In the system according to the present embodiment, the ABS control is started when a possibility for shifting to the locked state is detected in one of the wheels. Accordingly, in order to start the ABS control, as a precondition, a braking operation having a level at which a large slip rate S is generated in one of the wheels must be performed.

Figure 2:
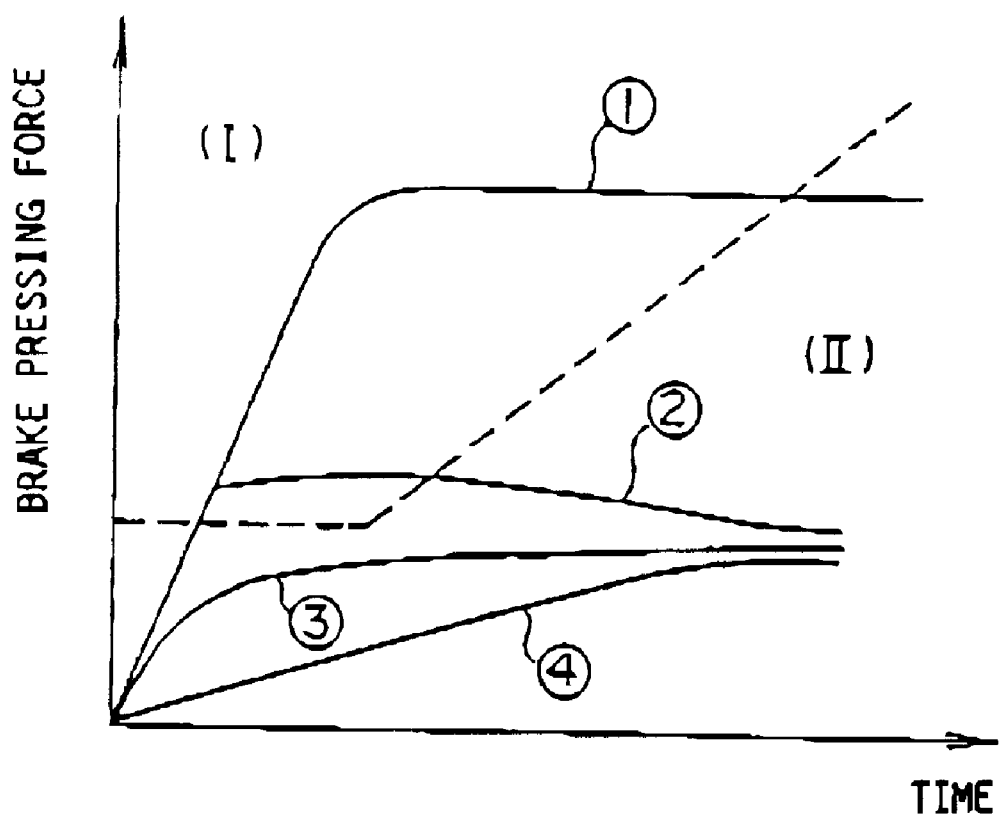
FIG. 2 is an illustration for showing a change in a brake pressing force achieved under various circumstances.

FIG. 2 shows changes in the brake pressing force $F_P$ applied to the brake pedal 30 with respect to time under various conditions. Curves indicated by ① and ② in FIG. 2 represent changes in the pressing force $F_P$ when an emergency braking is performed by a highly skilled driver (hereinafter, referred to as a high-grade driver) and an unskilled driver or a driver lacking (hereinafter, referred to as a beginner-grade driver), respectively. The emergency braking operation is an operation performed when is it desired to rapidly decelerate a vehicle. Accordingly, the brake pressing force associated with the emergency braking operation is preferably a force sufficiently large as the ABS control is performed.

As shown by the curve ①, when the driver of the vehicle is a high-grade driver, the brake pressing force $F_P$ is immediately and rapidly increased in response to establishment of a condition in which an emergency braking is required, and a large brake pressing force $F_P$ can be maintained for a long time. If such a brake pressing force $F_P$ is exerted on the brake pedal 30, a sufficiently high brake fluid pressure can be provided from the master cylinder 32 to each of the wheel cylinders 44** so as to start the ABS control.

However, as shown by the curve ② when the driver of the vehicle is a beginner-grade driver, the brake pressing force $F_P$ may not be increased to a sufficiently high value in response to the condition in which an emergency braking is required. If the brake pressing force $F_P$ exerted on the brake pedal 30 is not sufficiently increased as shown by the curve ② after an emergency braking is required, the wheel cylinder pressure $P_{W/C}$ in each of the wheels 44** is not sufficiently increased, which results in a possibility that the ABS control is not started.

As mentioned above, when the driver of the vehicle is a beginner-grade driver, the braking ability of the vehicle may not be sufficiently performed even when an emergency braking operation is performed despite that the vehicle has a good braking ability. Accordingly, the system according to the present embodiment is provided with a brake assist function for sufficiently increasing the wheel cylinder pressure $P_{W/C}$ even if the brake pressing force $F_P$ is not sufficiently increased when the brake pedal is operated with an intention to perform an emergency braking. Hereinafter, a control performed by the ECU 10 to achieve such a function is referred to as a brake assist control.

In the system according to the present embodiment, when performing the brake assist control, an accurate determination must be made as to whether, when the brake pedal 30 is operated, the operation is intended to perform an emergency braking operation or to perform a regular braking operation.

Curves indicated by shown ③ and ④ in FIG. 2 show changes in the brake pressing force $F_P$ when the driver operates the brake pedal with an intention to perform a normal braking operation under various conditions. As shown by the curves ① to ④, a change in the brake pressing force $F_P$ associated with the normal braking operation is gentle as compared to a change in the brake pressing force $F_P$ associated with an emergency braking operation. Additionally, a convergent value of the brake pressing force $F_P$ associated with the normal braking operation is not so large as a convergent value of the brake pressing force $F_P$ associated with an emergency braking operation.

Giving attention to those differences, when the brake pressing force $F_P$ is increased to a sufficiently large value at a rate of change exceeding a predetermined value after a braking operation is started, that is, when the brake pedal 30 is operated so that the brake pressing force $F_P$ reaches an area indicated by (I) in FIG. 2, it can be determined that an emergency braking is performed.

Additionally, when the rate of change of the brake pressing force $F_P$ is smaller than the predetermined value or when the convergent value of the brake pressing force $F_P$ is smaller than the predetermined value, that is, when the brake pedal 30 is operated so that the brake pressing force $F_P$ always changes within an area indicated by (II) in FIG. 2, it can be determined that a normal braking operation is performed.

Accordingly, in the system according to the present embodiment, an operational speed and an amount of operation of the brake pedal are detected or assumed, and, then, it is determined whether or not the operational speed exceeds a predetermined value and whether or not the amount of operation exceeds a predetermined value, and, thereby, it can be determined whether or not the operation on the brake pedal 30 is intended to perform an emergency braking.

In the present embodiment, the speed and magnitude of the operation of the brake pedal 30 are detected as a parameter that is the master cylinder pressure $P_{M/C}$ detected by the hydraulic pressure sensor 40 (hereinafter the parameter used for this application is referred to as a basic parameter) The master cylinder pressure $P_{M/C}$ indicates a value based on the magnitude of the operation of the brake pedal 30, and varies with a variation ratio $P_{M/C}$ based on the operation speed of the brake pedal 30. Hence, according to the apparatus of the present embodiment, when the braking operation is performed by the driver, it is possible to precisely determine whether the operation is an emergency operation or normal braking operation.

A description will be given of an operation of the system according to the embodiment in a case where it is determined an emergency braking is performed by the ECU 10. The ECU 10 determines that an emergency braking is performed when the master cylinder pressure $P_{M/C}$ that has a value greater than a predetermined value is detected and the variation ratio $\Delta P_{M/C}$ that has a value greater than a predetermined value is detected after the brake pedal 30 is pressed. When it is determined that the emergency braking is performed, the ECU 10 sends a drive signal to the STR 26, $SA_{-1}$ 46, $SA_{-2}$ 48 and $SA_{-3}$ 54.

When the STR 26 is turned ON in response to the above drive signal, the third fluid pressure passage 42 and the high-pressure 22 are joined together. In this case, an accumulator pressure $P_{ACC}$ is introduced into the third fluid pressure passage 42. When the $SA_{-1}$ 46 and $SA_{-2}$ 48 are turned on in response to the drive signal, the wheel cylinders 44FR and 44FL are jointed to the pressure-adjusting fluid pressure passages 56 and 62, respectively. Further, when the $SA_{-3}$ 54 is turned ON, the upstream portions of the SRRH 68 and SRLH 70 are jointed to the third fluid pressure passage 42. In this case, a state is formed in which all the wheel cylinders 44 are jointed to the respective holding solenoids SH and the pressure decreasing solenoids SR, and the accumulator pressure $P_{ACC}$ is introduced into the upstream portions of all the holding solenoids SH.

In the ECU 10, immediately after the execution of the emergency braking is detected, all the holding solenoids SH and all the pressure decreasing solenoids SR are maintained in the OFF state. Hence, as described above, when the accumulator pressure $P_{ACC}$ is introduced into the upstream portions of the holding solenoids SH, the fluid pressure is supplied to the wheel cylinders 44 as it is. Hence, the wheel cylinder pressure $P_{W/C}$ of all the wheel cylinders 44** is increased toward the accumulator pressure $P_{ACC}$.

As described above, according to the system of the present embodiment, when the emergency braking is performed, the wheel cylinder pressure $P_{W/C}$ of all the wheel cylinders 44** can rapidly be increased irrespective of the magnitude of the brake pressing force $F_P$. Hence, according to the system of the present invention, even if the driver is a beginner-grade driver, a large braking force can rapidly be produced after a situation necessary for an emergency braking occurs.

When the accumulator pressure $P_{ACC}$ is started to be applied to the wheel cylinders 44**, the slip ratios S of the wheels FL, FR, RL and RR are abruptly increased, and then the condition for execution of the ABS control stands. When the condition for execution of the ABS control is satisfied, the ECU 10 realizes ① the pressure increasing mode. ② holding mode and ③ pressure decreasing mode so that the slip ratios of all the wheels fall within an appropriate range, that is, all the wheels are not prevented from being locked.

If the ABS control is executed after the above-mentioned brake assist control, the wheel cylinder pressure $P_{W/C}$ is increased so that the brake fluid is supplied to the wheel cylinders 44** from the pump 12 and the accumulator 20. Thus, even if the pressure-increasing mode and the pressure-decreasing mode are alternately performed, so that the so-called bottoming of the master cylinder 32 may not occur.

When the emergency braking is performed and thus the brake assist control is executed, it is required to terminate the brake assist control when the brake pedal 30 is released from the pressed state. In the system of the present embodiment, the STR 26, $SA_{-1}$ 46, $SA_{-1}$ 48 and $SA_{-3}$ 54 are maintained in the ON states as have been described In the case where the STR 26, $SA_{-1}$ 46, $SA_{-2}$ 48 and $SA_{-3}$ 54 are maintained in the ON state, the fluid pressure chamber within the regulator 24 and the first and second fluid pressure chambers 32a and 32b of the master cylinder 32 are substantially closed spaces, In this case, the accumulator pressure $P_{ACC}$ is applied to the wheel cylinders of the wheels, while the master cylinder pressure $P_{M/C}$ depending on the brake pressing force $F_P$ is applied to the hydraulic pressure sensor 40. Hence, the ECU 10 can accurately determine, based on the detection value of the hydraulic sensor 40, whether the brake pedal 30 is released from the pressed state. When it is detected that the brake pedal 30 is released from the pressed state, the ECU 10 stops supplying the drive signal to the STR 26, $SA_{-1}$ 46, $SA_{-2}$ 48 and $SA_{-3}$ 54 and returns the brake force control apparatus to the state in which the normal control is performed (hereinafter, the above state will be referred to as a normal brake state).

The brake force control apparatus of the present embodiment is characterized in that execution of the brake assist control is started when a predetermined delay time elapses after an emergency braking required to start execution of the brake assist control is detected. A description will now be given of the above feature.

Figure 3A:
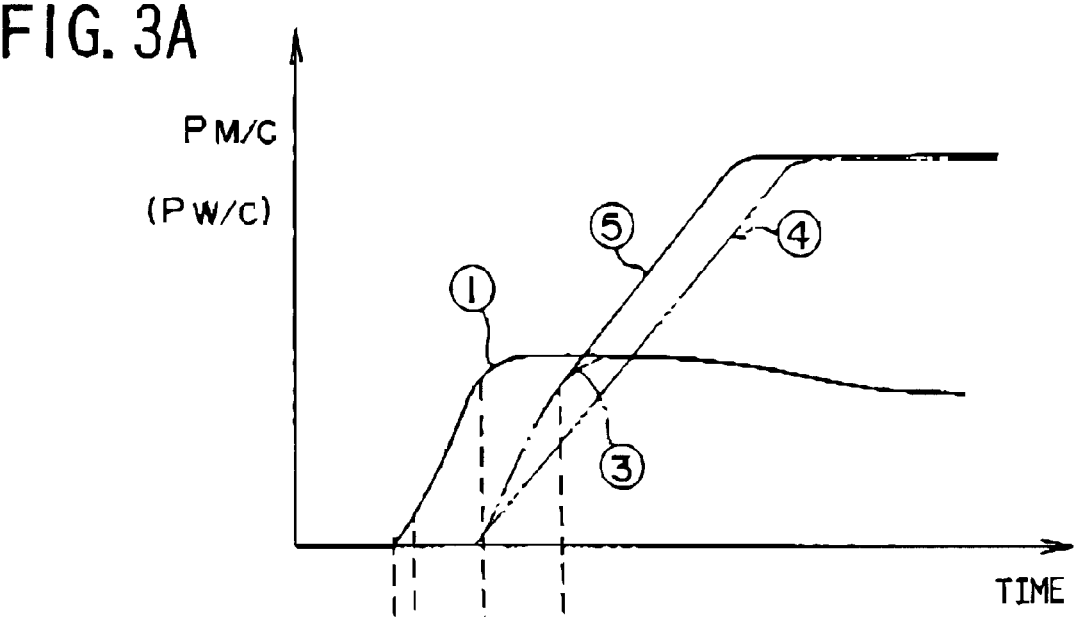
FIG. 3(A) is a diagram showing variations in a master cylinder pressure $P_{M/C}$ and a wheel cylinder pressure $P_{W/C}$ when an emergency braking is performed by a beginner-grade driver.
Figure 3B:
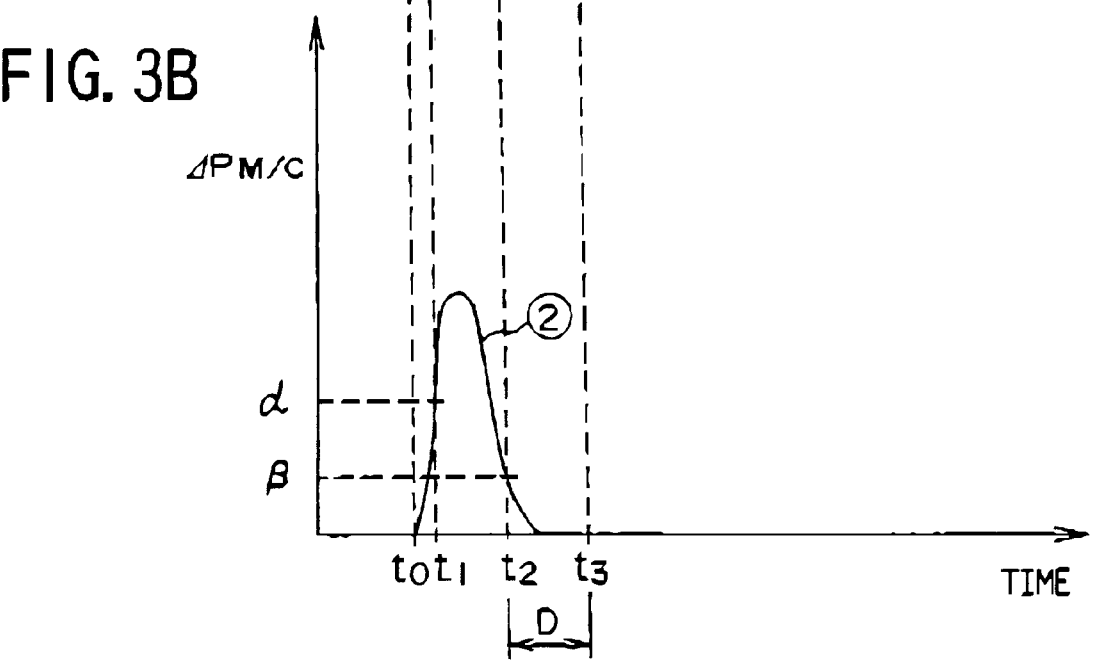
FIG. 3(B) is a diagram showing variations in a variation ratio $\Delta P_{M/C}$ of the master cylinder pressure $P_{M/C}$ when an emergency braking is performed by a beginner-grade driver.

FIG. 3(A) shows variations in the master cylinder pressure $P_{M/C}$ and the wheel cylinder pressure $P_{W/C}$ which occur when a beginner-grade driver performs an emergency braking. FIG. 3(B) shows the variation ratio $AP_{M/C}$ of the master cylinder pressure $P_{M/C}$ observed when a beginner-grade driver performs an emergency braking.

When an emergency braking is performed at time to by the beginner-grade driver, the master cylinder pressure $P_{M/C}$ is varied as indicated by curve ① shown in FIG. 3(A). In this case. the variation ratio $\Delta P_{M/C}$ is changed as indicated by curve ② shown in FIG. 3(B) As shown in curve ② the variation ratio $\Delta P_{M/C}$ increases rapidly and then decreases rapidly.

A first predetermined value shown in FIG. 3(B) is a threshold value related to the variation ratio $\Delta P_{M/C}$ and used to discriminate the normal braking and emergency braking over each other. When the braking operation executed by the driver is an emergency braking, it takes a very short time for the variation ratio $\Delta P_{M/C}$ to exceed first predetermined value $\alpha$ (time $t_1$) after the emergency braking is started (time $t_0$).

Hence, it is possible to determine, within a very short time after the braking is started, whether the braking is the normal braking or emergency braking. Thus, when the emergency braking is performed by the driver, it is possible to start the brake assist control immediately after the braking is started.

However, as indicated by curve ①, at the time (time $t_1$) when the braking by the driver is recognized as being an emergency braking, the master cylinder pressure $P_{M/C}$ is increasing with a sharp slope. Hence, at this stage, it is advantageous to maintain the master cylinder 32 as the fluid pressure source rather than the pump 12 and the accumulator 20 in terms of a rapid increase in the wheel cylinder pressure $P_{W/C}$.

Hence, in order to rapidly raise up the wheel cylinder pressure $P_{W/C}$ after the emergency braking is performed, it is preferable not to start the brake assist control until a certain delay time elapses after the emergency braking is started, more particularly, the increasing slope of the master cylinder pressure $P_{M/C}$ becomes gentle to some extent.

A second predetermined value $\beta$ shown in FIG. 3(B) is a threshold value used to discern whether the increasing slope of the master cylinder pressure $P_{M/C}$ becomes gentle. That is, in the present embodiment, at the time when the variation ratio $\Delta P_{M/C}$ indicated by curve ② becomes equal to or less than $\beta$, it can be determined that the increasing slope of the master cylinder pressure $P_{M/C}$ indicated by curve ① becomes gentle.

Hence, in the brake force control apparatus of the present embodiment, when an emergency braking is performed, it can be determined that the brake assist control should not be executed until $\Delta P_{M/C}<\beta$ is satisfied. FIG. 3(B) shows that the variation ratio $\Delta P_{M/C}$ reduces to the second predetermined value $\beta$ at time $t_2$.

The brake fluid flowing out of the master cylinder 32 flows in the wheel cylinders 44 through brake hoses. The wheel cylinder pressure $P_{W/C}$ increases after the brake fluid flows therein to some extent. The brake fluid flowing out of the master cylinder 32 is slightly consumed due to an expansion of the brake hoses in the progress of reaching the wheel cylinders 44. Hence, there is a time lag until an increase in the wheel cylinder pressure $P_{W/C}$ is started after an increase in the master cylinder pressure $P_{M/C}$ is started.

Curve ③ of the one-dot chained line shown in FIG. 3(A) shows a variation in the wheel cylinder pressure $P_{W/C}$ observed when the master cylinder pressure $P_{M/C}$ is changed as indicated by curve ① due to execution of the normal control. Curve ③ exemplarily indicates a case where an increase in the master cylinder pressure $P_{M/C}$ is started at time to and then an increase in the wheel cylinder pressure $P_{W/C}$ is started bust before time $t_2$.

The variation in the master cylinder pressure $P_{M/C}$ indicated by curve ③ is realized in the case where, at time $t_2$, the brake fluid necessary for initial press has already flowed in the wheel cylinders 44** and the brake fluid consumed due to expansion of the brake hoses have already been supplied from the master cylinder 32. Hence, if the brake assist control is started at time $t_2$, the wheel cylinder pressure $P_{W/C}$ can rapidly be increased in the case where the pump 12 and the accumulator 20 serve as the fluid pressure source.

Curve ④ indicated by the two-dot chained line shown in FIG. 3(A) shows a variation in the wheel cylinder pressure $P_{W/C}$ observed when the brake assist control is started at time $t_2$, that is, when it is determined that an increase in the master cylinder pressure $P_{M/C}$ becomes gentle. As shown in curve ④, if the brake assist control is started at that timing, the wheel cylinder pressure $P_{W/C}$ can sufficiently be increased even if the master cylinder pressure $P_{M/C}$ is not sufficiently increased to a level close to the upper limit value (see curve ①) after the emergency braking is performed.

However, at the stage of time $t_2$, the master cylinder pressure $P_{M/C}$ is considerably higher than the wheel cylinder pressure $P_{W/C}$, and thus a relatively large quantity of brake fluid flows in the wheel cylinders 44 from the master cylinder 32 even if the master cylinder pressure $P_{M/C}$ is not increased but the normal control is maintained. The quantity of brake fluid, which can be, supplied from the pump 12 and the accumulator 20 to the wheel cylinders 44 is limited to a level based on the capability of the pump 12 and the capacity of the accumulator 20. Hence, if there is a great difference between the master cylinder pressure $P_{M/C}$ and the wheel cylinder pressure $P_{W/C}$, as indicated by curves ③ and ④, the wheel cylinder pressure $P_{W/C}$ can rapidly be increased when the normal control is retained, as compared to the case where the brake assist control is started.

Hence, in the brake control apparatus of the present embodiment, in order to rapidly increase the wheel cylinder pressure $P_{W/C}$ after an emergency braking is performed, it is preferable that the brake assist control be not executed as long as the variation ratio $\Delta P_{M/C}$ obtained when the variation ratio $\Delta P_{M/C}$ obtained after the brake assist control is started (hereinafter, the above variation will be referred to as pressure increasing slope $\Delta P_{M/C}$) is greater than the variation ratio $\Delta P_{M/C}$ obtained when the normal control is maintained (hereinafter, the above variation ratio will be referred to as normal pressure increasing slope $\Delta P_{M/C}$).

The brake force control apparatus of the present embodiment realizes the above-mentioned functions by starting execution of the brake assist control when the predetermined delay time D elapses after the time when an emergency braking is started and the variation ratio aPMlc of the master cylinder pressure $P_{M/C}$ becomes less than the first predetermined value $\beta$ (hereinafter, the above time will be referred to as emergency braking state detection time). Curve ⑤ shown in FIG. 3(A) indicates a variation in the wheel cylinder pressure $P_{W/C}$ generated when the brake assist control is started at time $t_3$ when the delay time D elapses after time $t_2$.

As indicated by curve ⑤, when the brake assist control is started when the delay time D elapses after the emergency braking state detection time, the resultant wheel cylinder pressure $P_{W/C}$ is always greater than the wheel cylinder pressure $P_{W/C}$ generated when the normal control is maintained. Thus, according to the brake force control apparatus of the present embodiment, when an emergency braking is performed, both the capability of the master cylinder 32 and the capability of the pump 12 and the accumulator 20 are effectively utilized to rapidly increase the wheel cylinder pressure $P_{W/C}$.

Figure 4:
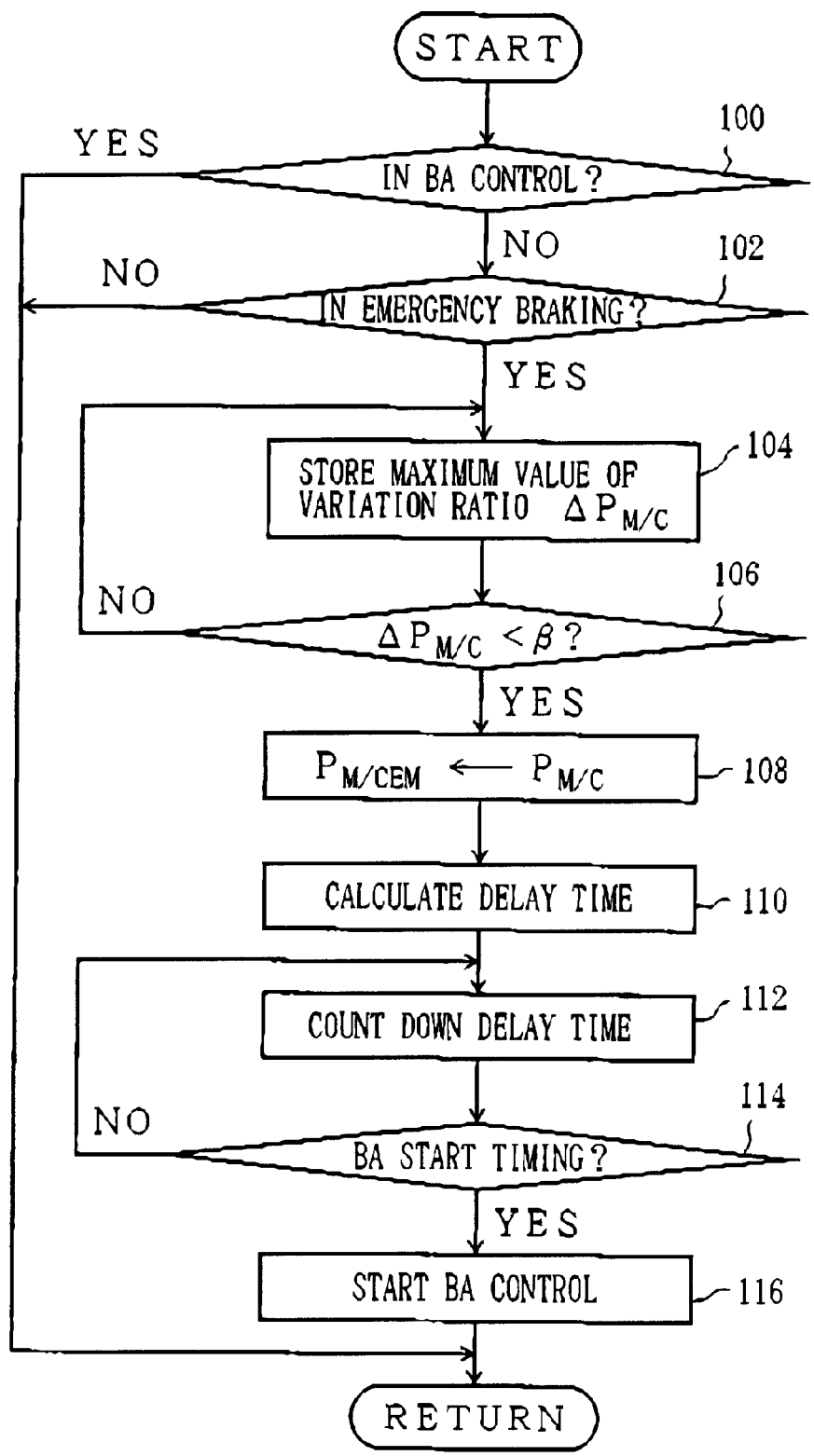
FIG. 4 is a flowchart of an example of a control routine executed by the brake force control apparatus shown in FIG. 1.

FIG. 4 is a flowchart of an example of a control routine executed by the ECU 10 so as to Implement the above-mentioned functions. When the present routine is activated, a process of step 100 is executed.

At step 100, it is determined whether the brake assist control is being executed. The present routine is a routine directed to determining the timing at which the brake assist control is started. Hence, if it is determined that the brake assist control has been executed, the routine is ended without any process. If the brake assist control has not been activated, a process of step 102 is next executed.

At step 102, it is determined whether an emergency braking has been performed. More particularly, it is determined whether, after an ON output of the brake switch 84 is issued, the variation ratio $\Delta P_{M/C}$ exceeding the first predetermined value a occurs in master cylinder pressure $P_{M/C}$. If it is determined that the emergency braking has not been performed, the routine is ended without any process. In contrast, if it is determined that the emergency braking has been performed, a process of step 104 is next executed.

At step 104, the process is executed in which a maximum value $MAX\Delta P_{M/C}$ of the variation ratio $\Delta P_{M/C}$ occurring in master cylinder pressure $P_{M/C}$ is stored, More particularly, if the variation ratio $\Delta P_{M/C}$ detected by he present-time process is greater than that detected in the last-time process, the detection value detected by the present-time process is stored as the updated maximum value $MAX\Delta P_{M/C}$. When the process of step 104 ends, a process of step 106 is next executed.

At step 106, it is determined whether the variation ratio $\Delta P_{M/C}$ of the master cylinder pressure $P_{M/C}$ is less than the second predetermined value β, that is, whether a variation in increase of the master cylinder pressure $P_{M/C}$ becomes gentle. If it is determined that a condition $\Delta P_{M/C}<\beta$ is not yet satisfied, the processes of steps 104 and 106 are repeatedly carried out until the above condition is satisfied. When it is determined that the condition $\Delta P_{M/C}<\beta$ is satisfied, a process of step 108 is then executed.

According to the above-mentioned process, at the time when the condition $\Delta P_{M/C}<\beta$ is satisfied, the maximum variation ratio $\Delta P_{M/C}$ generated in the master cylinder pressure $P_{M/C}$ obtained prior to the emergency braking state detection time is stored as the maximum value $MAX\Delta P_{M/C}$.

Figure 5:
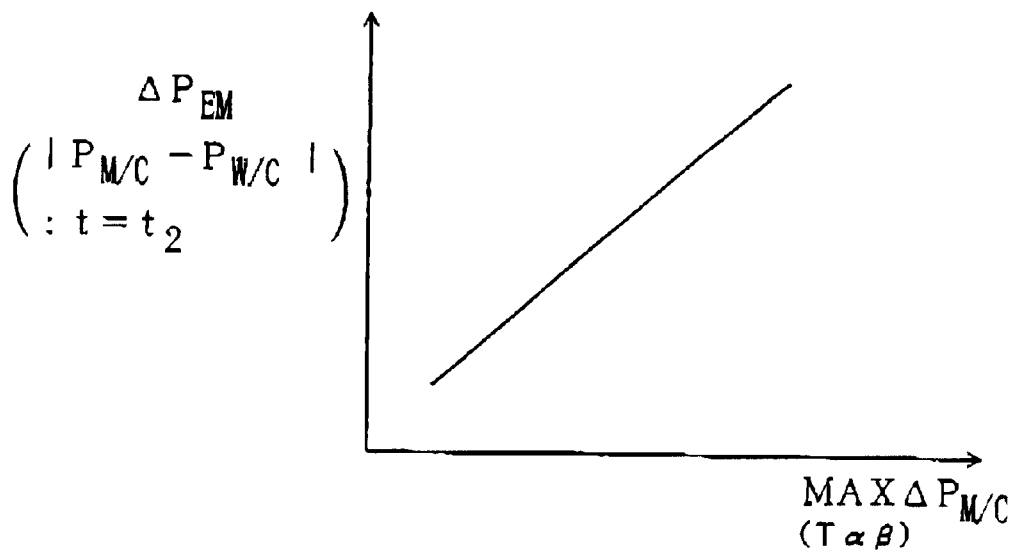
FIG. 5 is a diagram showing a relationship between a maximum value $\Delta P_{M/C}$ of the variation ratio $\Delta P_{M/C}$ of the master cylinder pressure $P_{M/C}$ and an emergency braking time differential pressure $\Delta P_{EM}$.

FIG. 5 shows a relationship between the above-mentioned maximum value $MAX\Delta P_{M/C}$ and an emergency braking time differential pressure $\Delta P_{EM}$. The emergency braking time differential pressure $\Delta P_{EM}$ is the difference (corresponding to the differential pressure $|P_{M/C}-P_{W/C}|$ at time $t_2$ shown in FIG. 3) between the master cylinder pressure $P_{M/C}$ and the wheel cylinder pressure $P_{M/C}$ obtained when the condition of step 106 is satisfied (the emergency braking state detection time). As shown in FIG. 5, the emergency braking time differential pressure $\Delta P_{EM}$ increases as the above-mentioned maximum value $MAX\Delta P_{M/C}$ increases.

At step 108, the detected value $P_{M/C}$ of the hydraulic pressure sensor 40 is stored as master cylinder pressure $P_{M/C}$ master cylinder pressure $P_{M/C}$ obtained at the emergency braking state detection time.

Figure 6:
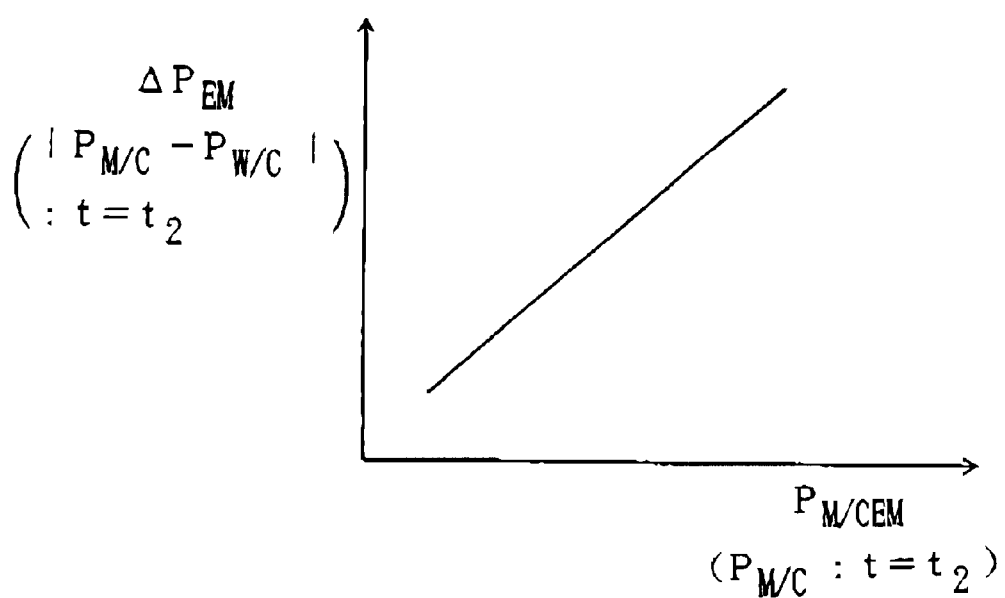
FIG. 6 is a diagram showing a relationship between an emergency braking time master pressure $P_{M/CEM}$ and the emergency braking time differential pressure $\Delta P_{EM}$.

FIG. 6 shows a relationship between the master cylinder pressure $P_{M/C}$ obtained at the time of emergency braking and the emergency braking time differential pressure $\Delta P_{EM}$. As shown in FIG. 6, the emergency braking time differential pressure $\Delta P_{EM}$ increases as the master cylinder pressure $P_{M/C}$ obtained at the time of emergency braking increases. When the process of step 108 ends, a process of step 110 is then executed.

The delay time D to be ensured between the emergency braking state detection time and the time of starting the brake assist control should be the time necessary for the controlled pressure increasing slope $P_{W/C}$ to exceed the normal pressure increasing slope $\Delta P_{W/C}$ after the emergency braking state detection time is recognized. The above time becomes long as the emergency braking time differential pressure $\Delta P_{EM}$ increases, and becomes short as the emergency braking time differential pressure $\Delta P_{EM}$ decreases.

As shown in FIG. 5, the emergency braking time differential pressure $\Delta_{EM}$ increases as the maximum value $MAX\Delta P_{M/C}$ increases. Hence, it is appropriate that the delay time D is elongated as the maximum value $MAX\Delta P_{M/C}$ increases. Further, as shown in FIG. 6, the emergency braking time differential pressure $\Delta_{EM}$ increases as the emergency braking time master pressure $P_{M/CEM}$ increases. Hence, it is appropriate that the delay time D becomes long as the emergency braking time master pressure $P_{M/CEM}$ increases.

At step 110, the delay time D is calculated based on the above-mentioned maximum value $MAX\Delta P_{M/C}$ and the emergency braking time master pressure $P_{M/CEM}$. When the process of step 110 ends, a process of step 112 is then executed.

Figure 7:
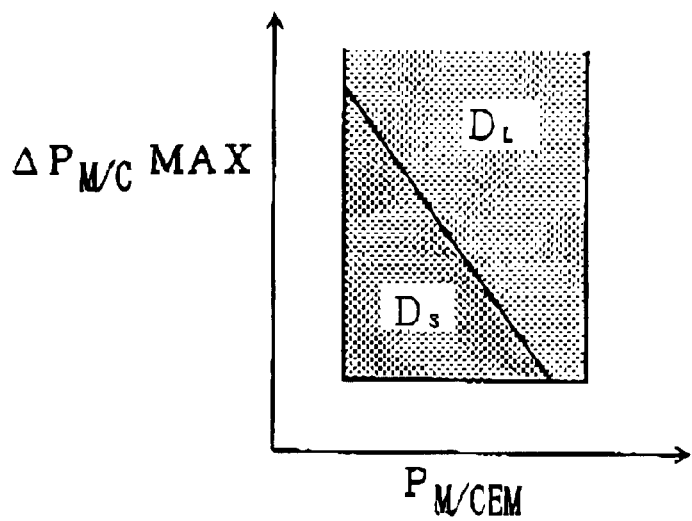
FIG. 7 shows an example of a map used to calculate a delay time D by the brake force control apparatus shown in FIG. 1.

FIG. 7 shows an example of a map, which is referred to when the delay time D is calculated. As shown in FIG. 7, the delay time is set to a comparatively long delay time $D_L$ or a comparatively short delay time $D_S$ on the basis of the maximum value $MAX\Delta P_{M/C}$ and the emergency braking time master pressure $P_{M/CEM}$.

More particularly, the delay time D is set to the comparatively long time $D_L$ if the maximum value $MAX\Delta P_{M/C}$ and the emergency braking time master pressure $P_{M/CEM}$ are great, that is, when the emergency braking time differential pressure $\Delta P_{EM}$ is large. In contrast, the delay time D is set to the comparatively short time DS if the maximum value $MAX\Delta P_{M/C}$ and the emergency braking time master pressure $P_{M/CEM}$ are small, that is, when the emergency braking time differential pressure $\Delta P_{EM}$ is small.

At step 112, the down counting of the delay time D is carried out. When the process of step 112 ends, a process of step 114 is then executed.

At step 114, it is determined whether the start timing of the brake assist control comes, that is, whether the down counting of the delay time D is completed. If it is determined that the down counting of the delay time D has not yet been completed, the process of step 112 is executed again. In contrast, it is determined that the down counting is completed, a process of step 116 is then executed.

At step 116, a process for starting the brake assist control is executed When the process of step 116 ends, the routine in progress is ended.

According to the above process, if it takes a comparatively long time for the controlled pressure increasing slope $\Delta P_{W/C}$ to exceed the normal pressure increasing slope $\Delta P_{W/C}$ after the emergency braking state detection time is recognized after the emergency braking state detection time is detected, the delay time D can be set to the comparatively long time $D_L$. Hence, according to the brake force control apparatus of the present embodiment, after the emergency braking is performed by the driver, it is possible to rapidly increase the wheel cylinder pressure $P_{W/C}$ by utilizing both the capability of the master cylinder 32 and the capabilities of the pump 12 and the accumulator 20.

By the way, in the present embodiment, by referring to the map of FIG. 7, the delay time D can be set in the two-stage formation. However, the method of setting the delay time D is not limited.

Figure 8:
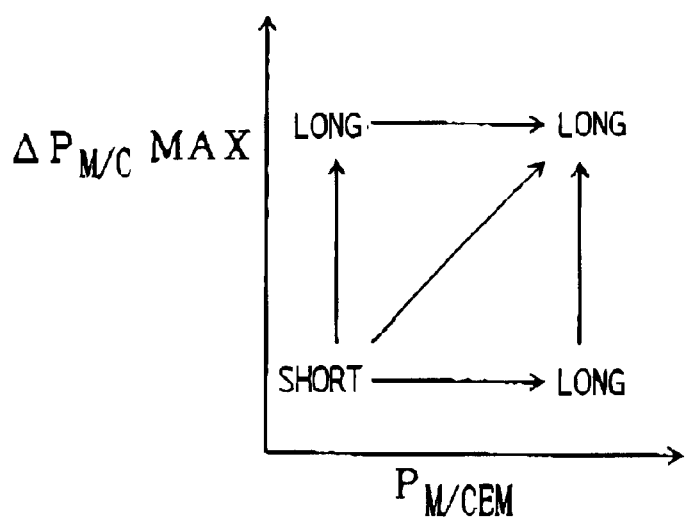
FIG. 8 shows another example of the map used to calculate the delay time D by the brake force control apparatus shown in FIG. 1.

FIG. 8 shows another example of a delay time map applicable to the brake force control apparatus of the present embodiment. The map of FIG. 8 is a map directed to continuously changing the delay time D in correspondence with the magnitude of the m value MAX$\Delta P_{M/C}$ and the magnitude of the emergency braking time master pressure $P_{M/CEM}$. By using the map of FIG. 8, it is possible to more precisely set the starting time of the brake assist control and more accurately control the pressure increasing characteristic of the wheel cylinder pressure $P_{W/C}$.

In the above-mentioned embodiment, the delay time D is estimated based on the maximum value MAX$\Delta P_{M/C}$ and the emergency braking time master pressure $P_{M/CEM}$. However, the method of calculating the delay time D is not limited to the above.

That is, in the brake force control apparatus of the present embodiment, the emergency braking time differential pressure $\Delta P_{EM}$ can be estimated to be great if the time T β it takes for the variation ratio $\Delta P_{M/C}$ to exceed the first predetermined value α and then becomes equal to or less than the second predetermined value 8 (the time between $t_1$ and $t_2$ shown in FIG. 3) is long. Further, it is possible to estimate the emergency braking time differential pressure $\Delta P_{EM}$ to be small if the above time T β is short (see FIG. 5).

Hence, the delay time D may be calculated on the basis of the time T β it takes for the variation ratio $\Delta P_{M/C}$ to exceed the first predetermined value α and then becomes equal to or less than the second predetermined value β. Although the above-mentioned embodiment employs the combination of the maximum value MAX$\Delta P_{M/C}$ and the emergency braking time master pressure $P_{M/CEM}$, the present invention is not limited to the above but may be configured so that the delay time D can be calculated based on any of the maximum value MAX$\Delta P_{M/C}$, the emergency braking time master pressure $P_{M/CEM}$, and the time T β.

Further, in the above-mentioned embodiment, the delay time is changed in accordance with the emergency braking time differential pressure $\Delta P_{EM}$. However, the present invention is not limited to the above, and may be configured so that the brake assist control is necessarily started when the constant delay time D elapses after the emergency braking state detection time.

Moreover, in the above-mentioned embodiment, the emergency braking state detection time is defined as the time when the variation ratio $\Delta P_{M/C}$ reduces to β after becoming equal to or greater than α, and the down counting is started after the emergency braking state detection time. However, the emergency braking state detection time is not limited to the above. That is, the time when an emergency braking is detected (when $P_{M/C}$>α) is defined as the emergency braking state detection time, and then the down counting of the delay time D may be started.

Furthermore, in the above-mentioned embodiment, the emergency braking and the normal braking are discriminated over each other on the basis of the master cylinder pressure $P_{M/C}$. However, the basis parameter used for the above discrimination is not limited to the master cylinder pressure $P_{M/C}$.

More particularly, wen the brake pedal 30 is operated, the brake pressing force $F_P$ exerted on the brake pedal 30 and the magnitude of stroke of the brake pedal 30 are varied in addition to variation in the master cylinder pressure $P_{M/C}$. Also, when the brake pedal 30 is operated and brake force is thus exerted on the vehicle, a deceleration G is generated on the vehicle. Hence, the discrimination over the emergency braking and the normal braking can be estimated based on, in addition to the aforementioned master cylinder pressure $P_{M/C}$ ①, the brake pressing force $F_P$ ②, pedal stroke L ③, vehicle deceleration G ④. estimated vehicle velocity $V_{SO}$ ⑤, and the wheel velocity VW** ⑥.

The brake pressing force $F_P$ ② and pedal stroke L ③ among the parameters ①, ②, ③, ④, ⑤ and ⑥ are sensitive to the operation of the brake pedal 30 as in the case of the master cylinder pressure $P_{M/C}$ ①. Hence, if these parameters are used as the basic parameters, the parameters are monitored so that it is easily possible to determine whether the pressing of the brake pedal 30 is released.

In contrast, the vehicle deceleration G ④, estimated vehicle velocity $V_{SO}$ ⑤ and the wheel velocity VW ⑥ among the parameters ①, ②, ③, ④, ⑤ and ⑥ are not changed until the brake forces of the wheels start to change. Hence, even if the brake pedal 30 is released from the pressed state during execution of the brake assist control, a large variation in the above parameters do not occur until the brake assist control is ended. Thus, when the vehicle deceleration G ④, estimated vehicle velocity $V_{SO}$ ⑤ and the wheel velocity VW ⑥ are used as the basic parameters, a pressing switch is provided which detects whether the pressing force $F_P$ is exerted on the brake pedal 30. Then, a decision is made as to whether the brake assist control is ended based on the output state of the pressing switch.

A description will now be given, with reference to FIGS. 9 through 11, of a second embodiment of the present invention.

In order to maintain the vehicle in the stable turning behavior, it is necessary for the front and rear wheels FL, FR, RL and RR to generate the respective cornering forces based on the vehicle velocity and the turning radius. More particularly, if the front wheels FL and Fr generate insufficient cornering forces, the vehicle will tend to drift out. In contrast, if the rear wheels RL and RR generate insufficient cornering forces, the vehicle will tend to spin.

The maximum value of the cornering forces that can be generated by the wheels depends on the performance of tires, the coefficient of friction against the road surface, and the loads exerted on the wheels. In addition, the maximum value of the cornering forces becomes great as a small degree of the ground contact ability of the wheels is consumed in order to generate the drive force and brake force. Hence, if the braking operation is performed while the vehicle is turning and thus the ground contact ability of the tires is partially consumed to generate the braking force, the maximum value of the cornering forces which can be generated by the tires will be reduced.

If the brake force is exerted on the vehicle, the load of the vehicle shifts to the front wheels FL and FR. When the load of the vehicle shifts to the front wheels FL and FR, the vertical load exerted on the rear wheels RL and RR is decreased, and thus the ground contact ability of the rear wheels is decreased. Hence, If the braking is performed while the vehicle is turning, the maximum value of the cornering forces that can be generated by the rear wheels RL and RR will greatly be decreased as compared to the situation before the brake force is generated.

By the way, in the brake force control device according to the aforementioned first embodiment, the brake assist control of the front wheels FL and FR and the brake assist control of the rear wheels RL and FR are simultaneously started when the predetermined delay time D elapses after the emergency braking is detected. In this regard, the brake force control apparatus of the first embodiment has a characteristic which is likely to degrade the turning behavior of the vehicle due to the start of the brake assist control in response to the emergency braking which is performed when the vehicle is turning.

The brake force control apparatus of the present embodiment is directed to overcoming the above problem of the brake force control apparatus of the first embodiment, and is characterized in that the brake assist control of the front wheels FL and FR is started, and the brake assist control of the rear wheels RL and RR is then started with an appropriate delay time (hereinafter, the above delay time will be referred to as rear wheel delay time $D_R$).

Figure 9:
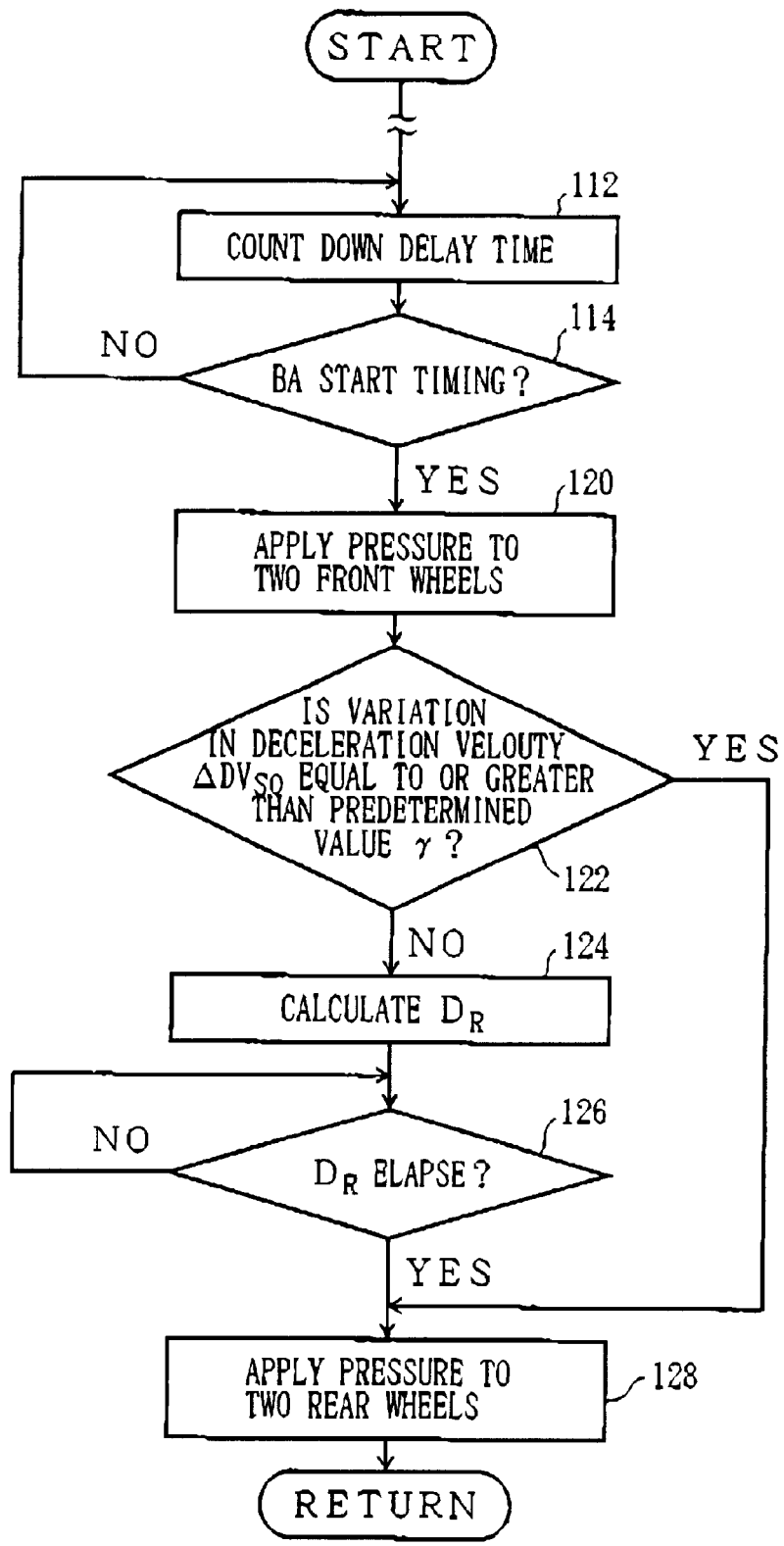
FIG. 9 is a flowchart of an example of another control routine executed by the brake force control apparatus shown in FIG. 1.

The brake force control apparatus of the present embodiment can be realized by causing the ECU 10 used in the system structure shown in FIG. 1 to execute a routine shown in FIG. 9 rather than the routine shown in FIG. 4.

FIG. 9 is a flowchart of a characterizing part of the routine executed in the present embodiment. After the routine of FIG. 9 is activated, the ECU 10 executes the processes of the steps 100 to 114 as in the case of the first embodiment. If it is determined that the brake assist control should be started now, a process of step 120 is executed.

At step 120, a process is started which starts the brake assist control of the two front wheels. More particularly, the process for turning ON STR 26 and turning ON $SA_{-1}$ 46 and $SA_{-2}$ 48 is started. When the above process is executed, the wheel cylinder pressure $P_{W/C}$ of the front wheels FL and FR is increased toward the accumulator pressure $P_{ACC}$. When the process of the present step ends, a process of step 122 is then executed.

At step 122, it is determined whether or not the variation ratio $\Delta DV_{SO}$ of a deceleration velocity $DV_{SO}$ generated in the vehicle is equal to or greater than a predetermined value γ. The deceleration $DV_{SO}$ is an estimated vehicle $V_{SO}$.

Figure 10:
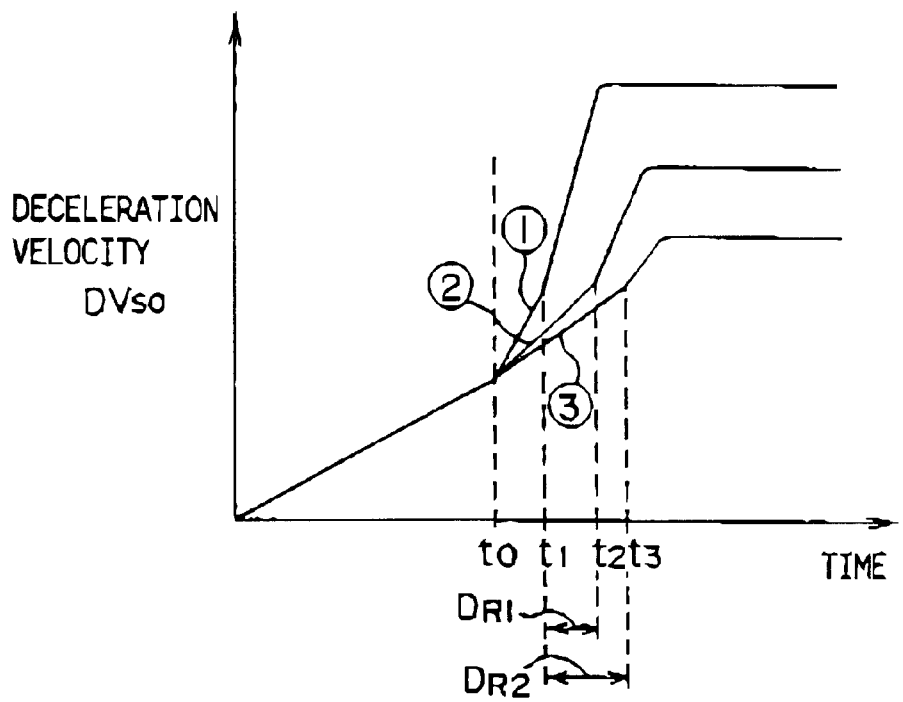
FIG. 10 is a diagram showing a variation in a vehicle deceleration performed, when a brake assist control is executed, in a vehicle equipped with a brake force control apparatus according to a second embodiment of the present invention.

Curve ① shown in FIG. 10 indicates a variation in the deceleration $DV_{SO}$ observed when the vehicle is running on a road having a high friction coefficient. when the vehicle is traveling on the road with a high friction coefficient, the deceleration $DV_{SO}$ is abruptly increased after time $t_0$, in response to the start of the brake assist control of the two front wheels. In other words, in the system of the present embodiment, it can be determined that the vehicle is traveling on the road with a high coefficient of friction if the deceleration $DV_{SO}$ is abruptly increased after time $t_0$.

Curves ② and ③ shown in FIG. 10 respectively indicate variations in the deceleration $DV_{SO}$ respectively observed when the vehicle is traveling on a road having a middle coefficient of friction and a road having a low coefficient of friction. When the vehicle is traveling on a road having a middle or low coefficient of friction, the deceleration $DV_{SO}$ gradually increases after the time $t_0$, as compared to that observed when the vehicle is traveling on the road having a high coefficient of friction. In other words, when the deceleration $DV_{SO}$ gradually increases after the time $t_0$, it can be determined that the vehicle is traveling of the road having a low coefficient of friction. In this case, the coefficient of friction against the vehicle traveling road can be estimated based on the deceleration $DV_{SO}$ that occurs after the time $t_0$.

The predetermined value γ used at step 122 is a threshold value provided to determine whether the vehicle is traveling on a road of a high coefficient of friction. Hence, if it is determined at step 122 that $\Delta DV_{SO}$ γ is not satisfied, it can be concluded that the vehicle was traveling on a road with a coefficient of friction lower than that the high coefficient of friction when the brake assist control was started. In this case, a process of step 124 is executed.

When the vehicle is traveling on the road with a low coefficient of friction, the turning behavior of the vehicle is likely to be changed due to the start of the brake assist control. Thus, if it is estimated that the vehicle is traveling on the road having a low coefficient of friction, it is preferable that the brake assist control of the rear wheels RL and RR is not started for a while after the brake assist control of the front wheels FL and FR is started.

At step 124, the rear wheel delay time $D_R$ is computed which should be ensured between the time when the brake assist control of the two front wheels is started and the time when the brake assist control of the two rear wheels is started. When the process of step 124 ends, a process of step 126 is then executed.

Figure 11:
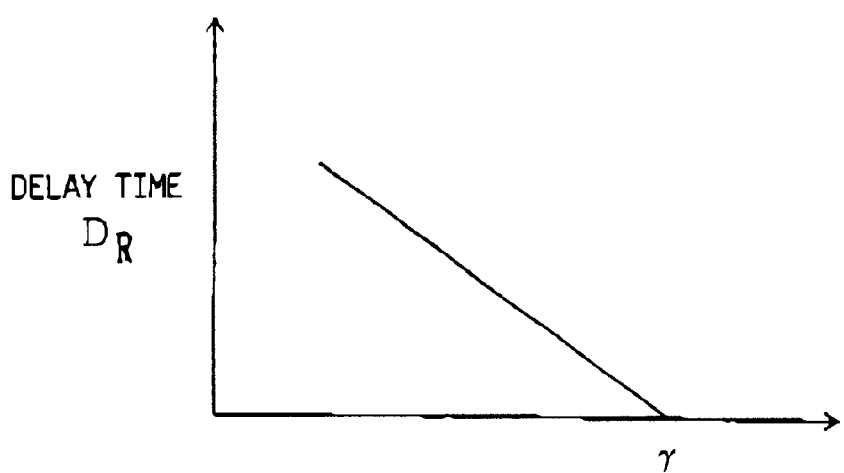
FIG. 11 shows an example of a map referred to when a rear wheel delay time is calculated in the control routine shown in FIG. 9.

FIG. 11 shows an example of a map that is to be referred to when the rear-wheel delay time $D_R$ is calculated at step 124. The rear-wheel delay time $D_R$ is set to a longtime as the variation ratio $\Delta DV_{SO}$ of the deceleration is small, that is, as the coefficient of friction against the road is small. Hence, according to the system of the present embodiment, the timing at which the brake assist control of the rear wheels is started can be delayed as the coefficient of friction against the road on which the vehicle is traveling is small.

At step 126, it is determined that the rear-wheel delay time $D_R$ elapses. The process of step 126 is repeatedly carried out until it is determined that the rear-wheel delay time $D_R$ elapses. When it is determined that the rear-wheel delay time $D_R$ elapses, a process of step 128 is executed.

At step 128, the process for starting the brake assist control of the two rear wheels is executed. More particularly, the process for turning ON $SA_{-3}$ 53 is performed. After the above process is executed, the wheel cylinder pressure $P_{W/C}$ of the rear wheels RL and RR is increased toward accumulator pressure $P_{ACC}$. When the process of step 128 ends, the routine in progress is ended.

In the present routine, if it is determined at step 122 that the variation ratio $\Delta DV_{SO}$ of the deceleration is greater than the predetermined value γ, it is possible to determine that the vehicle was traveling on a high-friction-coefficient road when the brake assist control of the front wheels was started. When the vehicle is traveling on a high-friction-coefficient road, a large change of the turning behavior of the vehicle does not occur even if the brake assist control of the rear wheels is started soon after the brake assist control of the front wheels is started. Hence, if it is determined at step 122 that $\Delta DV_{SO}$ γ is satisfied, steps 124 and 126 are bypassed, and a process of step 128 is executed.

Curve ① shown in FIG. 10 indicates a variation in the variation ratio $\Delta DV_{SO}$ of deceleration that is realized when it is determined that $\Delta DV_{SO}$ γ is satisfied (the condition prescribed at step 122.) after the brake assist control of the front wheels is started at time $t_0$. As indicated by curve ①, the deceleration $DV_{SO}$ of the vehicle is rapidly increased to a greater value.

Curve ② shown in FIG. 10 indicates a variation in the variation ratio $\Delta DV_{SO}$ of deceleration that is realized when it is determined that $\Delta DV_{SO}$ γ is not satisfied at time $t_1$ and the rear-wheel delay time $D_R$ is set to a comparatively short time $D_{R1}$. Curve ③ indicates a variation in the variation ratio $\Delta DV_{SO}$ of deceleration that is realized when it is determined that $\Delta DV_{SO}$ γ is not satisfied at time $t_1$ and the rear-wheel delay time $D_R$ is set to a comparatively long time $D_{R2}$.

As indicated by curves ① ② and ③, according to the brake force control apparatus of the present embodiment, as the coefficient of friction against the road on which the vehicle is traveling becomes smaller, the brake assist control of the two front wheels is active for a longer time. While the brake assist control is being performed to only the two front wheels, it is possible to generate sufficiently large cornering forces on the rear wheels RL and RR. Hence, according to the brake force control apparatus of the present embodiment, it is possible to stably maintain the turning behavior of the vehicle without being affected by the coefficient of friction against the road and to thus generate a large brake force when an emergency braking is required.

By the way, in the aforementioned embodiment, the brake assist control of the rear wheels RL and RR is necessarily executed after the rear-wheel delay time $D_R$ irrespective of whether the vehicle is turning, if the coefficient of friction against the road is low. However, the present invention is not limited to the above, but may be configured so that the start timing of the brake assist control of the rear wheels is delayed only if it is determined that the vehicle is turning by referring to a steering angle sensor or a yaw rate sensor.

Figure 12:
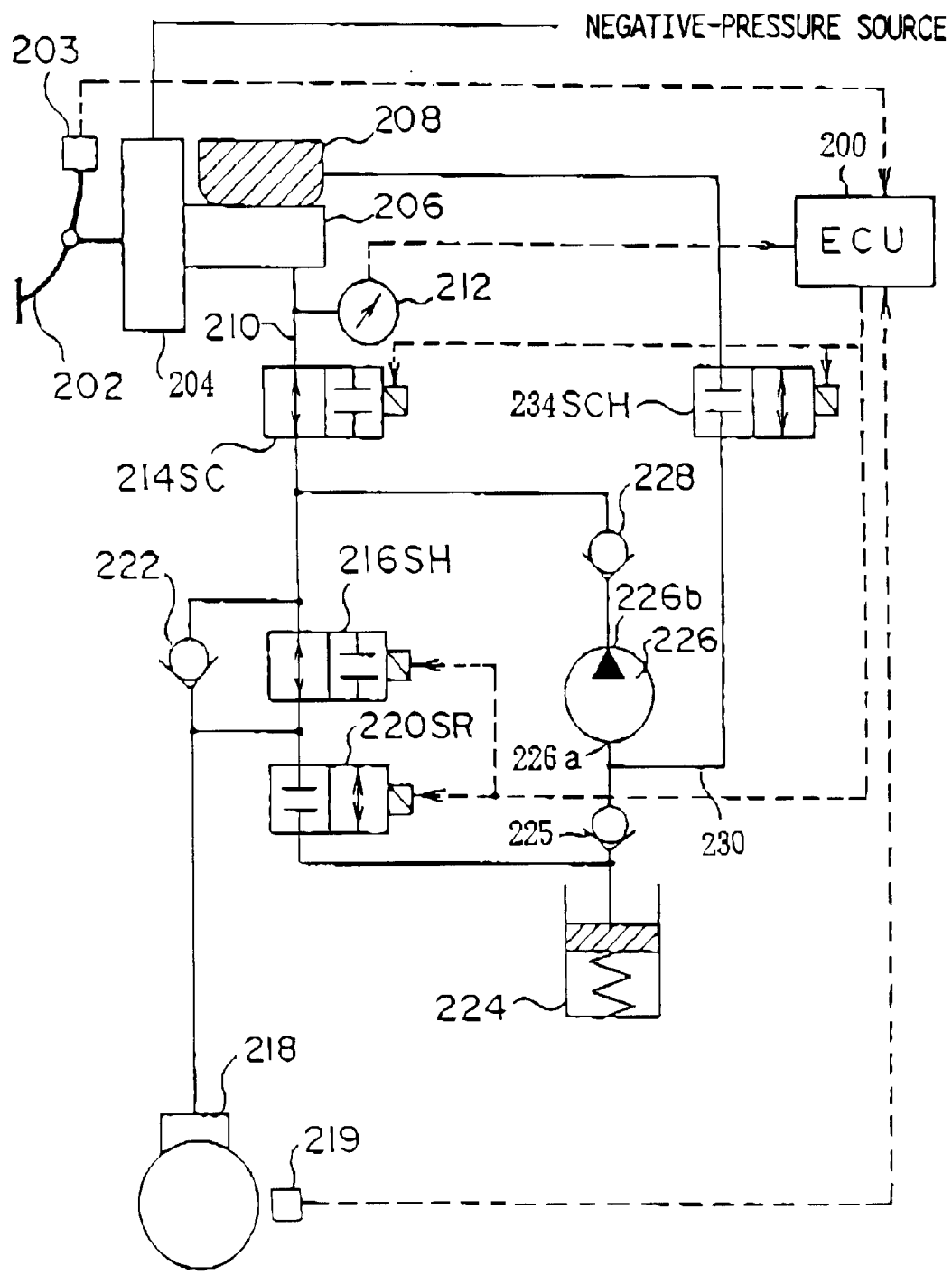
FIG. 12 is a system structure diagram of a brake force control apparatus according to a third embodiment of the present invention.

A description will now be given, with reference to FIG. 12, of a third embodiment of the present invention. FIG. 12 is a diagram of a system configuration of the brake force control apparatus according to the present embodiment. In FIG. 12, only a part of the configuration related to a single wheel is depicted for the convenience of description.

The brake force control apparatus shown in FIG. 12 is controlled by the ECU 200. The brake force control apparatus of the present embodiment is equipped with a brake pedal 202. A brake switch 203 is disposed in the vicinity of the brake pedal 202. The brake switch 203 generates an ON output when the brake pedal 202 is pressed. The output signal of the brake switch 203 is supplied to the ECU 200. The ECU 200 determines, based on the output signal of the brake switch 203, whether the braking is performed.

The brake pedal 202 is joined to a vacuum booster 204. The vacuum booster 204 operates with a drive source, which is depression at a manifold of an internal combustion engine. When the brake pressing force $F_P$ is applied to the brake pedal 30, the vacuum booster 204 generates an assist force $F_A$ having a given power ratio with respect to the brake pressing force $F_P$. A master cylinder 206 is fixed to the vacuum booster 204. The resultant of the brake pressing force $F_P$ and the assist force $F_A$ is input to the master cylinder 206.

The master cylinder 206 is equipped with a fluid pressure chamber provided therein. A reservoir tank 208 is arranged on the upper portion of the master cylinder 206. The fluid pressure chamber and the reservoir tank 208 are joined together when the brake pedal 202 is in the released state, and are isolated from each other when the brake pedal 202 is pressed. Hence, the brake fluid is supplemented each time the brake pedal 202 is released from the pressed state.

A fluid pressure passage 210 is joined to the fluid pressure chamber of the master cylinder 206. A hydraulic sensor 210, which generates an electric signal based on the internal pressure of the fluid pressure passage 210, is disposed to the fluid pressure passage 210. The output signal of the hydraulic pressure sensor 212 is supplied to the ECU 200. The ECU 200 detects the fluid .pressure generated by the master cylinder 206, namely, the master cylinder pressure $P_{M/C}$ on the basis of the output signal of the hydraulic pressure sensor 212.

A fluid pressure cut solenoid 214 (herein after simply referred to as SC 214) is arranged to the fluid pressure passage 210. The SC 214 is a two-position solenoid valve, which correspond to a conducting state and shutting state. The SC 214 is turned ON (the closed state) when the ECU 200 supplies a drive signal thereto.

The fluid pressure passage 210 is provided with a holding solenoid 216 (hereinafter, referred to as SH 216) on the downstream side of the SC 214. The SH 216 is a two-position solenoid valve which maintains an open state in a normal state (OFF state). The SH 216 is set to be in an ON state (closed state) by a drive signal being supplied by the ECU 200.

The downstream side of the SH 216 communicates with a wheel cylinder 218 and a pressure decreasing solenoid 220 (hereinafter, referred to as SR220). The SR 220 is a two-position solenoid valve, which maintains a closed state in a normal state (OFF state). SR 220 is set to be in an ON state (open state) by a drive signal being supplied by the ECU 200. Additionally, a check valve 222 which permits a fluid flow only in a direction from the wheel cylinder 218 to the fluid pressure passage 210 is provided between the wheel cylinder 218 and the fluid pressure passage 210.

A wheel velocity sensor 219 generates a pulse signal each time the wheel rotates a predetermined angle is provided near the wheel cylinder 218. An output signal of the wheel velocity sensor 219 is supplied to the ECU 200. The ECU 200 detects a wheel velocity based on the output signal of the wheel velocity sensor 219.

A reservoir 224 is provided on the downstream side of the SR 220. The brake fluid flowing out of the SR 220 when the SR 220 is set to be in the ON state (open state) is stored in the reservoir 224. It should be noted that the reservoir previously stores a predetermined amount of brake fluid. The reservoir 224 communicates with an inlet port 226a of a pump 226. Additionally, an outlet port 226b of the pump 226 communicates with the fluid pressure passage 210 via a check valve 228. The check vale 228 is a one-way valve, which permits a fluid flow only in a direction from the pump 226 to the fluid pressure passage 210.

A fluid pressure passage 230 connected to the reservoir tank 208 is joined to the reservoir 224. A switch solenoid 234 (hereinafter simply referred to as SCH 234) is disposed to the fluid pressure passage 230. The SCH 234 is a two-position solenoid valve, which maintains the closed state in the normal state (OFF state). The SCH 234 is switched to the closed state in response to a supply of the drive signal from the ECU 200.

A description will now be given of an operation of the brake force control apparatus of the present embodiment. In the present embodiment, the ECU 200 determines whether the brake assist control should be started and determines the start timing thereof by executing the routine shown in FIG. 4 of FIG. 9 as in the case of the aforementioned first or second embodiment.

More particularly, the ECU 200 starts to count down the delay time D when the condition $\Delta P_{M/C} < \beta$ is satisfied after an emergency braking is performed. The ECU 200 starts the brake assist control when the down counting of the delay time D is completed. When the ECU 200 executes the routine shown in FIG. 9, the brake assist control of only the two front wheels is started and then the brake assist control of the rear wheels is started after the rear-wheel delay time $D_R$.

In the system of the present embodiment, when the ECU 200 executes the normal control, the SC 214, SCH 234, SH 216 and SR 220 axe all maintained in the OFF state, and the pump 226 is maintained in the inactive state. Under the above situation, only the master cylinder 206 can function as the fluid pressure source, and all of the brake fluid flowing out of the master cylinder 206 is supplied to the wheel cylinder 218. Hence, in this case, the wheel cylinder pressure $P_{W/C}$ of the wheel cylinder 218 is adjusted to a fluid pressure having the given power ratio with respect to the brake pressing force $F_P$.

After the braking is started, if a slip ratio S of the wheels exceeds a predetermined value, the ECU 200 starts the ABS control as in the case of the ECU 10 of the first embodiment. As will be described below, the ABS control is implemented by driving the SH 216 and SR 220 while operating the pump 226 when the brake pedal 202 is pressed, that is, when the master cylinder pressure $P_{M/C}$ is appropriately boosted.

When the master cylinder pressure $P_{M/C}$ is output which is supplied from the master cylinder 204 and is appropriately boosted, the SH 216 is switched to the closed state, and the SR 220 is switched to the closed state. Hence, it is possible to boost the wheel cylinder pressure $P_{W/C}$ while the master cylinder pressure $P_{M/C}$ is the upper limit. Hereinafter, the above state will be referred to as ① pressure-increasing mode. Under the same environment as described above, if the SH 216 is set to the closed state and the SR 220 is set to the closed state, the wheel cylinder pressure $P_{W/C}$ can be maintained. If the SH 216 is set to the closed state and the SR 220 is set to the open state, the wheel cylinder pressure $P_{W/C}$ can be reduced. These states will hereinafter be referred to ② holding mode and ③ pressure-decreasing mode, respectively. The ECU 200 realizes ① pressure-increasing mode, ② holding mode and ③ pressure-decreasing mode so that the slip ratio S of the wheels becomes equal to an appropriate value.

If the brake pedal 202 is released from the pressed state by the driver while the ABS control is active, it is necessary to rapidly reduce the wheel cylinder pressure $P_{W/C}$. In the system of the present embodiment, a check valve 222 which permits a flow of fluid from the wheel cylinder 218 to the master cylinder 206 is disposed to a hydraulic pressure circuit corresponding to the wheel cylinder 218. Hence, according to the system of the present embodiment, it is possible to rapidly reduce the wheel cylinder pressure $P_{W/C}$ of the wheel cylinder 222 after the brake pedal 202 is released from the pressed state.

While the ABS control is being executed in the system of the present embodiment, the wheel cylinder pressure $P_{W/C}$ is boosted in such a way that the master cylinder 206 serves as the fluid pressure source. Also, the wheel cylinder pressure $P_{W/C}$ can be reduced by flowing the brake fluid in the wheel cylinder 218 to the reservoir 224. Hence, if the pressure-increasing mode and the pressure-decreasing mode are alternately performed, the brake fluid gradually flows to the reservoir 224 from the master cylinder 206. However, in the system of the present embodiment, the brake fluid flowing to the reservoir 224 is pressure-sent to the master cylinder 206 by the pump 226. Hence, even if the ABS control continues for a long time, the bottoming of the master cylinder will not occur.

As described above, the ECU 200 starts the brake assist control when the predetermined delay time D elapses after the emergency braking state required to start execution of the brake assist control is detected. In the system of the present embodiment, the brake assist control is realized by turning ON both the SC 214 and SCH 234, that is, setting the SC 214 and SCH 234 to the close and open states, respectively, and by activating the pump 226.

Under the above situation, the master cylinder 206 and the wheel cylinder 218 is isolated from each other. The pump 226 pressure-sends the brake fluid supplied from the reservoir tank 208 via the fluid pressure passage 230 toward the wheel cylinder 218. Hence, the wheel cylinder pressure $P_{W/C}$ is boosted in such a way that the pump 226 serves as the fluid pressure source.

In the system of the present embodiment, boosting of the wheel cylinder pressure $P_{W/C}$ by the pump 226 is started after a state is formed in which the controlled pressure increasing slope $\Delta P_{M/C}$ exceeds the normal pressure increasing slope $\Delta P_{W/C}$. Thus, even by the brake force control device of the present embodiment, as in the case of the aforementioned first embodiment, it is possible to effectively utilize the capability of the master cylinder 206 and the capability of the pump 226 and to thus boost the wheel cylinder pressure $P_{W/C}$ rapidly after the emergency braking is performed.

When the ECU 200 executes the routine shown in FIG. 9, it is possible to rapidly set up the brake force of the two front wheels after the emergency braking Is performed and to rapidly set up the brake force of the two rear wheels after the predetermined time $D_R$ elapses. In this case, as in the case of the aforementioned second embodiment, it is possible to suppress a variation in the turning behavior of the vehicle which is caused when an emergency braking is performed while the vehicle is turning.

If the wheel cylinder pressure $P_{W/C}$ is rapidly increased as described above, the slip ratio S of the wheels is abruptly increased, and then the condition for execution of the ABS control stands. When the condition for execution of the ABS control stands, the ECU 200 ① pressure-increasing mode, ② holding mode and ③ pressure-decreasing mode so that the slip ratio S of the wheels becomes equal to an appropriate value.

In the system of the present embodiment, while the brake assist control is being performed, the SC 214 is maintained in the ON state as described above. When the SC 214 is the ON state, the fluid pressure chamber of the master cylinder 206 and the upstream portion of the SC 214 substantially form a closed space.

Under the above situation, the master cylinder pressure $P_{M/C}$ becomes a value depending on the brake pressing force $F_P$. Hence, the ECU 200 monitors the output signal of the master cylinder pressure $P_{M/C}$ detected by the hydraulic pressure sensor 212 and thus determines whether the brake pedal 202 is released from the pressed state. When the ECU 200 detects that the brake pedal 202 is released from the pressed state, the ECU 200 stops supplying the drive signal to the SC 214 and SCH 234, and terminates the brake assist control.

By the way, in the above-mentioned third embodiment, the master cylinder pressure $P_{M/C}$ is used as the basic parameter for discriminating the normal braking over emergency braking. However, the basic parameter is not limited to the above, but the brake pressing force $F_P$, pedal stroke L, vehicle deceleration G, estimated vehicle velocity $V_{SO}$, and the wheel velocity VW** may be used as the basic parameters as in the case of the first embodiment.

What is claimed is:

1. A brake force control apparatus having an operation fluid pressure generating mechanism (32; 206) generating an operation fluid pressure depending on the degree of operation of a brake pedal by a driver, a high pressure source (12, 20; 226) generating a control fluid pressure higher than that of the fluid pressure generated by said operation fluid pressure generating mechanism, a switch mechanism (46, 48, 54; 214) for selectively connecting one of the operation fluid pressure generating mechanism and the high pressure source to a wheel cylinder (44FR, 44FL, 44RR, 44RL; 218), and emergency braking detection means (102, 106) for detecting execution of an emergency braking, wherein when an emergency braking is performed by the driver, a brake assist control for boosting a wheel cylinder pressure is executed in such a way that the high-pressure source serves as a fluid pressure source, there are provided start timing detection means (104, 108, 110, 112, 114) for calculating a start time of brake assist control as the time after the execution of the emergency braking has been detected when a controlled pressure increasing slope obtained by boosting the wheel cylinder pressure with the high-pressure source used as the fluid pressure source will exceed a normal pressure increasing slope obtained by boosting the wheel cylinder pressure with the operation fluid pressure generating mechanism used as the fluid pressure source, and brake assist control execution means (116; 120, 128) for starting the brake assist control after the emergency braking is detected and the start time is reached.

2. The brake force control apparatus as claimed in claim 1, wherein said start timing detection means comprises delay time counting means (104, 108, 110, 112, 114) for determining the start time when a predetermined delay time (D, $D_L$ $D_S$) elapses after the emergency braking is detected.

3. The brake force control apparatus as claimed in claim 2, wherein said start timing detection means comprises delay time setting means (104, 108, 110) for setting the predetermined delay time on the basis of a differential pressure ($\Delta P_{EM}$) generated between the operation fluid pressure and the wheel cylinder pressure when the emergency braking is detected.

4. The brake force control apparatus as claimed in claim 2, wherein said start timing detection means comprises delay time setting means (104, 110) for setting the predetermined delay time on the basis of a differential pressure ($\Delta P_{M/C}$) generated before the emergency braking is detected.

5. The brake force control apparatus as claimed in claim 2, wherein said start timing detection means comprises delay time setting means (104, 110) for setting the predetermined delay time on the basis of a maximum value of a brake operation speed generated before the emergency braking is detected.

6. The brake force control apparatus as claimed in claim 2, wherein said start timing detection means comprises delay time setting means (108, 110) for setting the predetermined delay time on the basis of an amount of brake operation speed generated before the emergency braking is detected.

7. The brake force control apparatus as claimed in claim 2, wherein said start timing detection means comprises delay time setting means (108, 110) for setting the predetermined delay time on the basis of an amount of brake operation speed generated when the emergency braking is detected.

8. The brake force control apparatus as claimed in claim 2, wherein said start timing detection means comprises delay time setting means for setting the predetermined delay time on the basis of a time (T$\beta$B) necessary for a brake operation speed to exceed a first predetermined value ($\alpha$) and then become equal to a second predetermined value ($\beta$).

9. The brake force control apparatus as claimed in claim 1, wherein the switch mechanism comprises a front wheel switch mechanism (46, 48) that selectively connects one of the operation fluid pressure generating mechanism and the high-pressure source to wheel cylinders (44FR, 44FL) of front wheels, and a rear wheel switch mechanism (54) that selectively connects one of the operation fluid pressure generating mechanism and the high-pressure source to wheel cylinders (44RR, 44RL) of rear wheels, and wherein said brake assist control execution means comprises front wheel control execution means (120) that starts the brake assist control of the front wheels when said start time is reached after the emergency braking is detected, and rear wheel control execution means (122, 124, 126, 128) that starts the brake assist control of rear wheels when a predetermined rear wheel delay time ($D_R$) elapses after the brake assist control of the front wheels is started.

10. The brake force control apparatus as claimed in claim 9, wherein said rear wheel control execution means comprises rear wheel delay time setting means (122, 124) for setting the predetermined rear wheel delay time on the basis of a condition of a road on which the vehicle is traveling.

11. The brake force control apparatus as claimed in claim 9, wherein said rear wheel control execution means comprises rear wheel delay time setting means (122, 124) for setting the predetermined rear wheel delay time on the basis of a deceleration ($DV_{SO}$) generated on the vehicle after the brake assist control of the front wheels.

12. A brake force control apparatus having a high-pressure source (12, 20; 226) which generates a predetermined control fluid pressure, a front wheel fluid pressure control mechanism (46, 48) that controls a wheel cylinder pressure of front wheels with the high-pressure source used as a fluid pressure source, a rear wheel fluid pressure control mechanism (54) that controls a rear wheel cylinder pressure of rear wheels with the high-pressure source used as the fluid pressure source, and emergency braking detection means (102, 106) for detecting execution of an emergency braking, wherein when an emergency braking is performed by the driver, a brake assist control for generating a wheel cylinder pressure higher than that generated at a normal time, there are provided front wheel control execution means (120) for starting the brake assist control of the front wheels after the emergency braking is detected, and rear wheel control execution means (122, 124, 126, 128) for starting the brake assist control of the rear wheels when a predetermined rear wheel delay time ($D_R$) elapses after the brake assist control of the front wheel is started.

13. The brake force control apparatus as claimed in claim 12, wherein said rear wheel control execution means comprises rear wheel delay time setting means (122, 124) for setting the predetermined rear wheel delay time on the basis of a condition of a road on which the vehicle is traveling.

14. The brake force control apparatus as claimed in claim 12, wherein said rear wheel control execution means comprises rear wheel delay time setting means (122, 124) for setting the predetermined rear wheel delay time on the basis of a deceleration ($DV_{SO}$) generated on the vehicle after the brake assist control of the front wheels.

15. A brake force control apparatus comprising:

an operation fluid pressure generating mechanism generating an operation fluid pressure depending on a degree of operation of a brake pedal by a driver and serving as a master cylinder;

a high-pressure source generating a control fluid pressure higher than the operation fluid pressure for a brake assist control;

a switch mechanism selectively connecting one of the operation fluid pressure generating mechanism and the high-pressure source to a wheel cylinder;

an emergency braking detection unit detecting execution of an emergency braking on the brake pedal by the driver, and determining a delay time between a time of the detection of the execution of the emergency braking and a time of connection of the high-pressure source to the wheel cylinder to start the brake assist control, based on a braking effectiveness of the operation fluid pressure generating mechanism; and a brake assist control unit executing the brake assist control for boosting a wheel cylinder pressure by connecting the high-pressure source to the wheel cylinder when it is determined, after the execution of the emergency braking is detected and the delay time has elapsed, that the wheel cylinder pressure is more rapidly raised by the high-pressure source than by the operation fluid generating mechanism.

* * * * *

UNITED STATES PATENT AND TRADEMARK OFFICE
CERTIFICATE OF CORRECTION

PATENT NO. : 6,460,942 B1
DATED : October 8, 2002
INVENTOR(S) : Satoshi Shimizu et al.

It is certified that error appears in the above-identified patent and that said Letters Patent is hereby corrected as shown below:

<u>Column 1,</u>
Line 52, after "control" insert -- . --.

<u>Column 2,</u>
Line 7, change "Anyway, the" to -- The --.
Line 21, change "he" to -- the --.

<u>Column 6,</u>
Line 38, change "norma" to -- normal --.

<u>Column 10,</u>
Line 10, after "lacking" insert -- experience --.

<u>Column 11,</u>
Line 58, change "jointed" to -- joined --.

<u>Column 12,</u>
Line 40, after "spaces" change "," to -- . --.
Line 63, change "AP $_{M/C}$" to -- $\Delta P_{M/C}$ --.

<u>Column 13,</u>
Line 62, change "bust" to -- just --.

<u>Column 14,</u>
Line 45, change "aPMIc" to -- $\Delta P_{M/C}$ --

<u>Column 16,</u>
Line 47, after "executed" insert -- . --.

UNITED STATES PATENT AND TRADEMARK OFFICE
CERTIFICATE OF CORRECTION

PATENT NO. : 6,460,942 B1
DATED : October 8, 2002
INVENTOR(S) : Satoshi Shimizu et al.

It is certified that error appears in the above-identified patent and that said Letters Patent is hereby corrected as shown below:

Column 21,
Line 49, change "fluid .pressure" to -- fluid pressure --.

Column 22,
Line 23, change "vale" to -- valve --.
Line 52, change "axe" to -- are --.

Signed and Sealed this

Twenty-second Day of July, 2003

JAMES E. ROGAN
*Director of the United States Patent and Trademark Office*